United States Patent [19]

Aono

[11] Patent Number: 4,639,094
[45] Date of Patent: Jan. 27, 1987

[54] GRADIENT INDEX LENS SYSTEM
[75] Inventor: Yasuhiro Aono, Kawasaki, Japan
[73] Assignee: Nippon Kogaku K. K., Tokyo, Japan
[21] Appl. No.: 536,371
[22] Filed: Sep. 27, 1983
[30] Foreign Application Priority Data
  Oct. 4, 1982 [JP] Japan .................. 57-173277
  Oct. 4, 1982 [JP] Japan .................. 57-173278
[51] Int. Cl.[4] ............................................ G02B 3/00
[52] U.S. Cl. ................................. 350/413; 350/96.31
[58] Field of Search ............... 350/413, 96.31, 96.18
[56] References Cited
  U.S. PATENT DOCUMENTS
  3,801,181  4/1974  Kitano et al. ................... 350/96
  3,980,391  9/1976  Stewart .......................... 350/96.31

Primary Examiner—John K. Corbin
Assistant Examiner—P. M. Dzierzynski
Attorney, Agent, or Firm—Shapiro and Shapiro

[57] ABSTRACT

A gradient index lens system in which spherical aberration and coma are well corrected and which has an excellent imaging performance comprises a first gradient index lens and a second gradient index lens. The second gradient index lens has a gradient index different from that of the first gradient index lens and is either cemented to the first gradient index lens or disposed with a predetermined air space with respect to the first gradient index lens.

23 Claims, 61 Drawing Figures

----- MERIDIONAL RAYS
―― SAGITTAL RAYS

---- MERIDIONAL RAYS
—— SAGITTAL RAYS

----- MERIDIONAL RAYS
——— SAGITTAL RAYS

| MERIDIONAL DIRECTION | SAGITTAL DIRECTION |
|---|---|
| y=0.130  |  |
| y=1.85  |  |
| y=0.0  | |

---- MERIDIONAL RAYS
—— SAGITTAL RAYS

--- MERIDIONAL RAYS
— SAGITTAL RAYS

--- MERIDIONAL RAYS
— SAGITTAL RAYS

1

GRADIENT INDEX LENS SYSTEM

BACKGROUND OF THE INVENTION

1. Field of the Invention

This invention relates to an optical system having an optical element having a gradient index dependent on the distance from the optical axis, namely, a so-called gradient index rod lens system.

2. Description of the Prior Art

In recent years, devices for reading information highly densely recorded on a recording medium by condensing a laser beam into a tiny spot, such as optical video discs and digital audio discs, have been developed. As an optical system for condensing a laser beam into a tiny spot, use is nowadays made of a lens system similar to a microscope objective lens comprising a combination of several ordinary spherical lenses. Recently, however, pick-up lenses using convergent gradient index rod lenses, namely, so-called Selfoc lenses, for the purpose of achieving the ease of assembly and adjustment of the lenses and the compactness and light weight of the lenses have been reported.

However, these reports provide means for correcting only spherical aberration and do not at all mention off-axis aberrations, namely, coma, curvature of field, etc.

As will later be described, in a gradient index lens having a single piece planar end surface, spherical aberration can be corrected very highly accurately by suitably selecting the coefficient of the high order term of the gradient index, but at the same time, the sine condition cannot be satisfied and therefore, great coma occurs and it becomes impossible to condense a tiny spot at a point slightly spaced apart from the optical axis.

SUMMARY OF THE INVENTION

It is an object of the present invention to provide a gradient index lens system in which not only spherical aberration but also coma is well corrected and which has an excellent imaging performance.

It is another object of the present invention to provide a gradient index lens system of a very high performance in which both of spherical aberration and coma are well corrected and further curvature of field is also corrected.

The present invention achieves the above objects by constructing a lens system by combining at least two different gradient index lenses and particularly, finding the optimum solution of the coefficient of the high order term with respect to the gradient index of each lens.

The invention will become fully apparent from the following detailed description thereof taken in conjunction with the accompanying drawings.

DESCRIPTION OF THE PREFERRED EMBODIMENTS

The gradient index of a convergent gradient index lens has a distribution rotationally symmetrical with respect to the optical axis and is expressed by the following equation:

$$n_2 = n_0^2 \{1 - (gr)^2 + h_4(gr)^4 + h_6(gr)^6\}, \qquad (1)$$

where $n_0$ is the refractive index of the center of the lens, r is the radial distance from the optical axis, g is a parameter indicative of the degree of refractive index gradient, and $h_4$ and $h_6$ are the coefficients of the fourth and sixth order terms as the high order terms of the gradient index.

Figure 1:
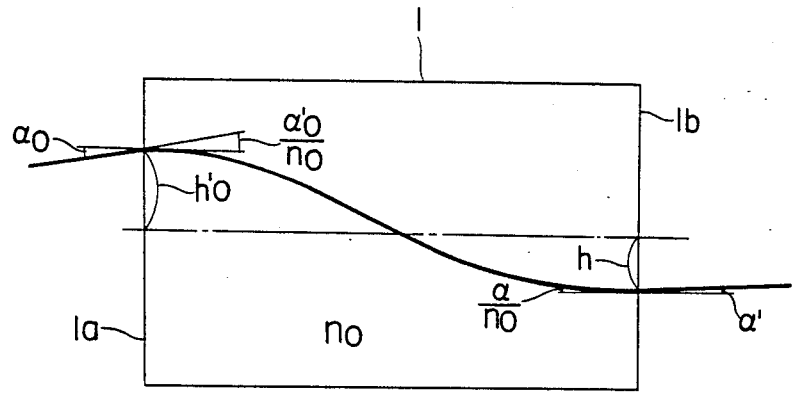
FIG. 1 is an optical path illustration showing the state of a paraxial ray on the entrance surface and the exit surface of a popular gradient index lens.

Generally, when the gradient index of a medium is expressed by $n(/)$ as the function of coordinates $/$, the behavior of light rays in the medium is described by the following differential equation:

$$\frac{d}{ds}\left[ n(/) \frac{d/}{ds} \right] = \nabla n(/), \qquad (2)$$

where s is the length measured along the path of the light ray. Equation (2) can be solved by applying a suitable variable conversion and by a well-known numerical solution of differential equations such as the Runge-Kutta method (see *Applied Optics*, Vol. 21, No. 6, p. 984). Any light ray incident on a gradient index lens whose gradient index is expressed by equation (1) can be pursued by solving equation (2) by the numerical solution, and calculation of the aberrations after the pursuit can be carried out entirely in the same manner as in the case of the optical system of an ordinary uniform medium system. Also, if restricted to the paraxial area, equation (2) can be analytically solved to obtain the following paraxial ray pursuit equation:

$$\begin{pmatrix} h \\ \alpha \end{pmatrix} = \begin{pmatrix} \cos gz & -\frac{1}{n_0 g} \sin gz \\ n_0 g \sin gz & \cos gz \end{pmatrix} \begin{pmatrix} h_{0'} \\ \alpha_{0'} \end{pmatrix}, \quad (3)$$

where $h_{0'}$ and $h$, as shown in FIG. 1, represent the heights of the paraxial ray on the entrance surface $1a$ and the exit surface $1b$ of a popular gradient index lens 1, $\alpha_{0'}$ represents the converted inclination immediately after the refraction of the paraxial ray incident on the entrance surface $1a$, and $\alpha$ represents the converted inclination immediately before the refraction of the paraxial ray arriving at the exit surface $1b$. Of course, the inclination $\alpha_0$ of the light ray incident on the entrance surface $1a$ shown in FIG. 1 and the inclination $\alpha'$ of the light ray emergent from the exit surface $1b$ are in the correspondence relation by the usual refraction law between $\alpha_0'$ and $\alpha$.

An example will now be described in which the present invention is used in a pick-up lens for an optical disc.

The most important factors of a pick-up lens for an optical disc are numerical aperture (hereinafter referred to as NA) and working distance (hereinafter referred to as WD). First, the relation among the specifications NA and WD and the gradient index characteristics $n_0$ and $g$ of the pick-up lens and the length $z$ and the effective radius $r_0$ of the lens will be considered. Suppose the construction of a single piece gradient index lens having planar opposite ends. The laser beam entering the lens system is a parallel beam and therefore, in equation (3), $\alpha_{0'}=0$ and accordingly, $$\left. \begin{array}{l} h = h_{0'} \cos gz \\ \alpha = h_{0'} n_0 g \sin gz \end{array} \right\} \quad (4)$$

If the focal length of the lens system is f, $$f = h_{0'}/\alpha \quad (5)$$

and also, $$WD = h/\alpha \quad (6)$$

If it is assumed that coma is corrected and the sine condition is satisfied, $$NA = r_0/f \quad (7)$$

From equations (4)–(7), $$g = NA/n_0 \sqrt{r_0^2 - (NA \cdot WD)^2} \quad (8)$$

$$z = \frac{n_0 \sqrt{r_0^2 - (NA \cdot WD)^2}}{NA} \cdot \cos^{-1}(NA \cdot WD/r_0) \quad (9)$$

$n_0$ is an amount determined by the selection of the material of the lens and is of a value of the order of 1.5–1.75. The provision of the gradient index is effected by the ion exchange method or the like, but a lens in which $r_0$ is too great is difficult to manufacture and the order of $r_0 = 1.0$–3.0 may be considered to be a practically possible range. Accordingly, when the specifications of the pick-up lens are determined by equations (8) and (9), the gradient index character $g$ and the lens length $z$ are correspondingly determined primarily. But, as is apparent from equation (8), there is a limiting condition $$r_0 > NA \cdot WD \quad (10)$$

between the specifications NA, WD and the effective radius $r_0$ of the lens. That is, if an attempt is made to set NA to a great value and moreover secure a sufficient working distance, a correspondingly great lens diameter will be required.

Where a pick-up lens is constructed by bringing two convergent gradient index lenses of different gradient index characteristics into intimate contact with each other, the imaging equation is:

$$\begin{pmatrix} h \\ \alpha \end{pmatrix} = \begin{pmatrix} \cos g_2 z_2 & -\frac{1}{n_2 g_2} \sin g_2 z_2 \\ n_2 g_2 \sin g_2 z_2 & \cos g_2 z_2 \end{pmatrix} \times \quad (11)$$

$$\begin{pmatrix} \cos g_1 z_1 & -\frac{1}{n_1 g_1} \sin g_1 z_1 \\ n_1 g_1 \sin g_1 z_1 & \cos g_1 z_1 \end{pmatrix} \begin{pmatrix} h_0 \\ 0 \end{pmatrix}$$

If the specifications NA and WD of the pick-up lens and the characteristics $n_1$, $n_2$, $g_1$, $g_2$ and effective diameter $r_0$ of the two gradient index lenses are given from equations (5), (6), (7) and (11), the lengths $z_1$ and $z_2$ of the respective lenses will be primarily determined.

Correction of spherical aberration and coma will now be described. According to the literature (JOSA, vol. 60, No. 11, p. 1436), aberration coefficients of the third order attributable to the fact that light rays pass through a gradient index medium are expressed by the following equations:

$$\sigma_1 = \nabla \left( \frac{h\alpha^3}{n_0^2} \right) - \int_0^z \left[ 8n_2 h^4 + \frac{4n_1 h^2 \alpha^2}{n_0^2} - \frac{\alpha^4}{n_0^3} \right] dz \quad (12)$$

$$\sigma_2 = \nabla \left( \frac{h\alpha^2 \bar{\alpha}}{n_0^2} \right) - \quad (13)$$

$$\int_0^z \left[ 8n_2 h^3 \bar{h} + \frac{2n_1 h\alpha}{n_0^2} (\bar{h}\alpha + \bar{h}\alpha) - \frac{\alpha^3 \bar{\alpha}}{n_0^3} \right] dz$$

$$\sigma_3 = \nabla \left( \frac{h\alpha\bar{\alpha}^2}{n_0^2} \right) - \quad (14)$$

$$\int_0^z \left[ 8n_2 h^2 \bar{h}^2 + \frac{4n_1 \bar{h} h \alpha \bar{\alpha}}{n_0^2} - \frac{\alpha^2 \bar{\alpha}^2}{n_0^3} \right] dz$$

where $\sigma_1$ is the spherical aberration coefficient, $\sigma_2$ is the coma coefficient, $\sigma_3$ is the astigmatism coefficient, $h$ and $\alpha$ are the height and converted inclination, respectively, of the paraxial on-axis ray, $\bar{h}$ and $\bar{\alpha}$ are the height and converted inclination, respectively, of the paraxial principal ray, and $\nabla(q)$ represents the difference between the value at the upper limit of the integration of a certain amount and the value at the lower limit. The gradient index is expressed by $$n = n_0 + n_1 r^2 + n_2 r^4.$$

The aberration coefficient attributable to the refraction at the end surface is entirely similar to the aberration coefficient of the uniform medium system. In equations (12)–(14), the other coefficients than the coefficient $n_2$ of the fourth order term of the gradient index are the amounts determined by the second order term and so on, namely, the paraxial amounts. Considering a gradient index lens, there is always a value of $n_2$ which gives $\sigma_i$ ($i=1, 2, 3$) which negates the aberration created by the refraction on the end surface of the lens and the surface of the optical disc with respect to an arbitrary aberration. At this time, it is generally impossible to negate the other aberrations at the same time. That is, the degree of freedom of the aberration correction of the gradient index is 1. This situation also holds true of high order aberrations.

Figure 2A:
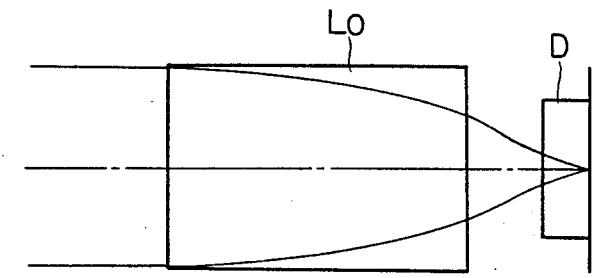
FIG. 2A is an optical path illustration of a comparative example.
Figure 2B:
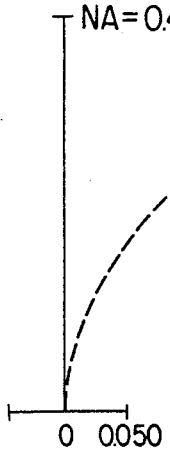
FIG. 2B shows the ray aberrations thereof.
Figure 2B:
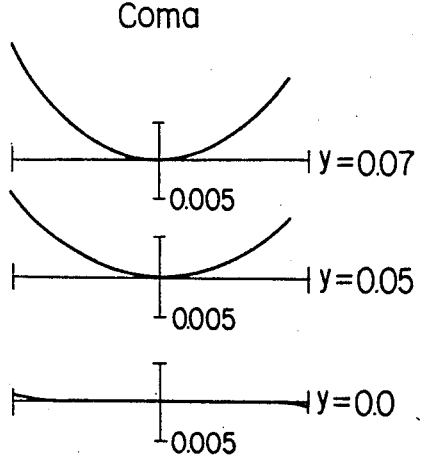
Figure 2C:
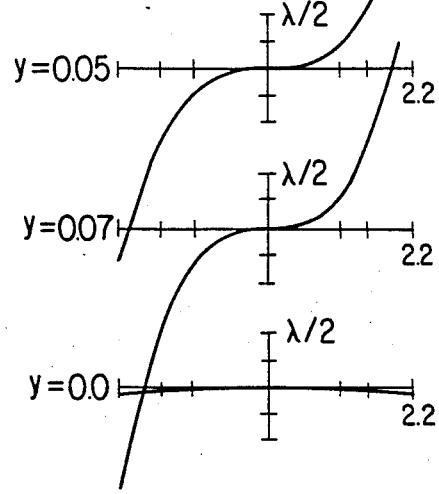
FIG. 2C shows the wave front aberrations thereof.
Figure 2C:
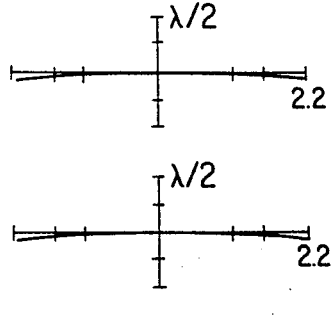

As an example of the comparison with the embodiments of the present invention which will later be described, an attempt has been made to construct a pick-up lens having the specifications of NA=0.45 and WD=2.55 mm by only a gradient index lens $L_0$ of $N_0=1.66666$, $g=0.1974$, $r_0=1.8$ mm and $z=4.43$ mm in accordance with equations (8) and (9). The numerical data of the optical disc D are the same as those of the embodiments which will later be described. The optical path of this comparative example is shown in FIG. 2A. In this optical path illustration, the light ray from the on-axis object point is shown. In order that spherical aberration may be corrected, $h_4=0.762$ and $h_6=-0.489$. As shown in the ray aberration illustration of FIG. 2B, spherical aberration is corrected substantially completely, while the sine condition is not satisfied and accordingly, coma is greatly created. This is apparent also from the wave front aberration illustration of FIG. 2C.

Thus, at least two independent high order gradient indices are required in order that spherical aberration and coma may be corrected at the same time. Accordingly, if a single gradient index lens is divided into two lenses $L_1$ and $L_2$ and discrete high order gradient indices $h_{41}$, $h_{61}$ and $h_{42}$, $h_{62}$ are imparted to the respective lenses $L_1$ and $L_2$, the degree of freedom of aberration correction will be 2 and simultaneous correction of spherical aberration and coma will become possible.

If it is assumed that the gradient indices of the gradient index lenses $L_1$ and $L_2$ having different gradient indices are $n_1$ and $n_2$, these can be expressed by:

$$n_1^2 = n_{01}^2 \{1 - (g_1 r)^2 + h_{41}(g_1 r)^4 + h_{61}(g_1 r)^6\} \quad (15)$$

$$n_2^2 = n_{01}^2 \{1 - (g_2 r)^2 + h_{42}(g_2 r)^4 + h_{62}(g_2 r)^6\} \quad (16)$$

where $n_0$ is the center refractive index, $r$ is the radial distance from the optical axis, $g$ is a parameter indicative of the degree of index gradient, $h_4$ and $h_6$ are the coefficient of the fourth order term and the sixth order term as the high order terms of the gradient index, and subscript numbers 1 and 2 mean the amounts regarding the two gradient index lenses $L_1$ and $L_2$ having different gradient indices.

In the combination of such two lenses, it is difficult to analytically solve the high order gradient index coefficients $h_{41}$, $h_{42}$, $h_{61}$ and $h_{62}$ at which spherical aberration and coma are corrected at the same time, but they can be numerically found by a conventional lens designing technique such as the optimizing technique using the damped least square method or the like.

As regards the pick-up lens for an optical disc, it is desired that wave front aberration be corrected to at least $\lambda/4$ or less in the entire area of the image plane having a diameter of 0.14–0.2 mm. However, even when the position of the condensed spot is deviated from the center, if an auto-focusing mechanism works to automatically set the best image plane, curvature of field is not called in question. To satisfy these conditions, it is necessary that both of spherical aberration and coma be corrected very well and it is essential for high order gradient index coefficients to satisfy the following conditions:

$$1.0 < h_{41} < 5.0$$

$$-1.5 < h_{61} < -0.1$$

$$-5.0 < h_{42} < -0.5$$

$$1.0 < h_{62} < 8.0$$

If any of the upper limits and the lower limits of the above conditions is exceeded, it will become impossible to correct spherical aberration and coma at a time.

Some embodiments of the present invention will now be described. In each of the embodiments, the thickness of the optical disc is 1.1 mm, the material thereof is plastics and the refractive index is 1.48546. Also, aberrations are corrected with respect to the oscillation wavelength $\lambda=780$ nm of a semiconductor laser.

The specifications and numerical data of Embodiment 1 will be shown below.

| NA = 0.45, WD = 2.55, Maximum image height: 0.07 mm | | |
|---|---|---|
| $n_{01} = n_{02} = 1.7$ | $g_1 = g_2 = 0.243$ | $r_0 = 1.6$ mm |
| $h_{41} = 2.381$ | $h_{61} = -0.325$ | $z_1 = 1.57$ |
| $h_{42} = -2.591$ | $h_{62} = 3.655$ | $z_2 = 1.57$ |

Figure 3A:
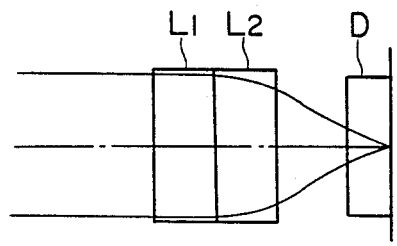
FIGS. 3 to 6 relate to first to fourth embodiments of the present invention, FIGS. 3A, 4A, 5A and 6A being optical path illustrations, FIGS. 3B, 4B, 5B and 6B being graphs showing the gradient index of a first lens, FIGS. 3C, 4C, 5C and 6C being graphs showing the gradient index of a second lens, FIGS. 3D, 4D, 5D and 6D showing ray aberrations, and FIGS. 3E, 4E, 5E and 6E showing wave front aberrations.
Figure 3B:
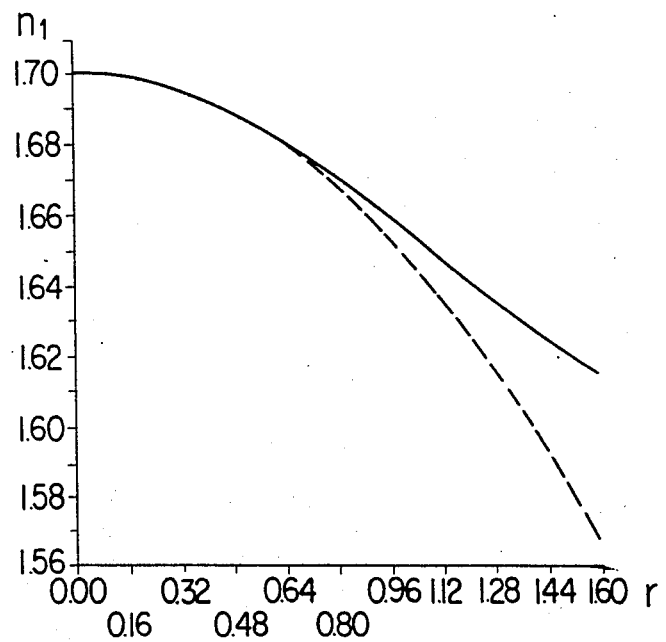
Figure 3C:
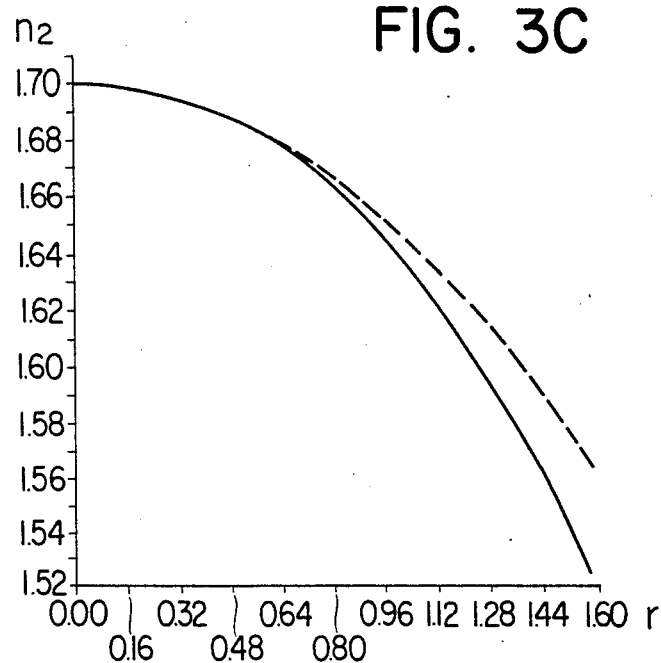
Figure 3D:
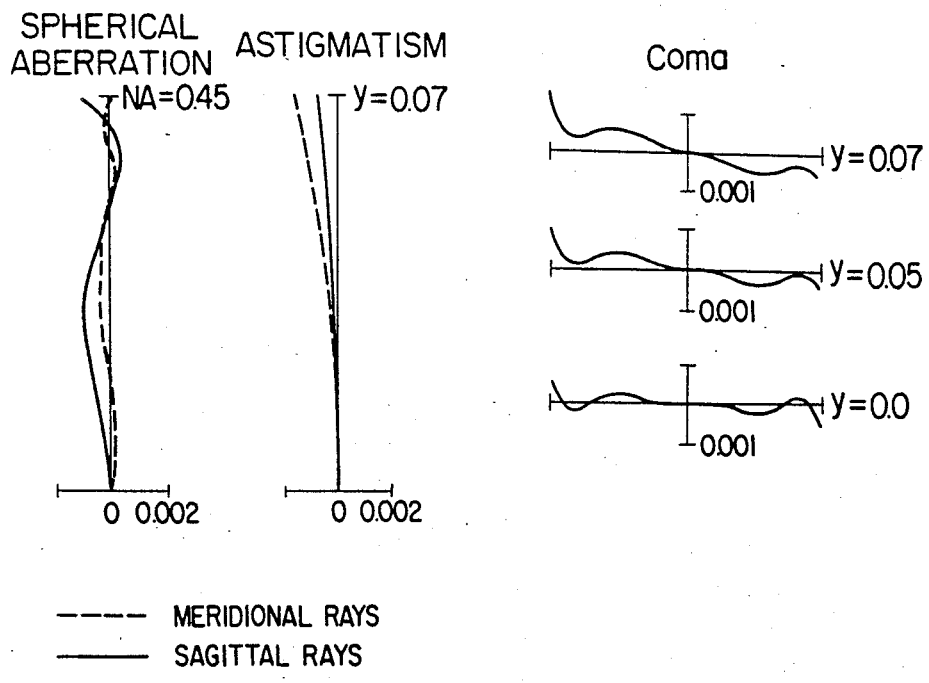
Figure 3E:
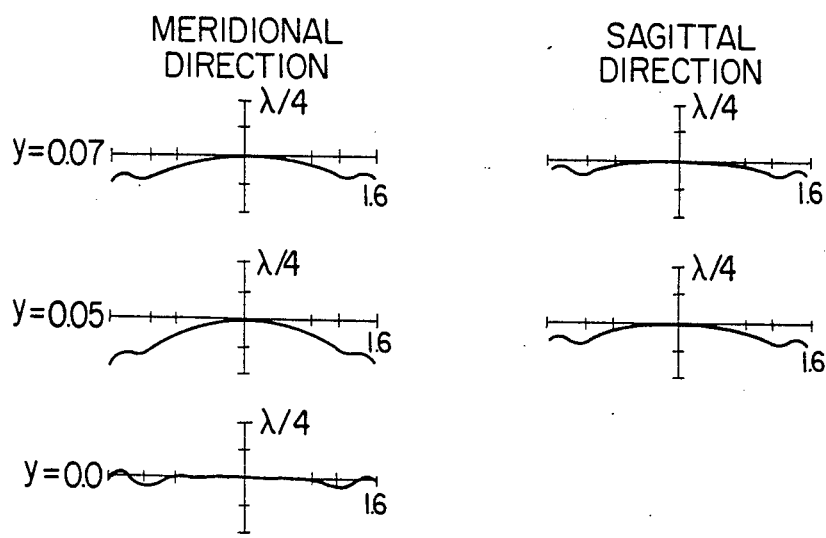

FIG. 3A shows the optical path, FIGS. 3B and 3C show the gradient indices of the first and second lenses $L_1$ and $L_2$, respectively, FIG. 3D shows ray aberrations, and FIG. 3E shows wave front abberations.

In the optical path illustration, the light ray from the on-axis object point is shown. In the ray aberration illustration, spherical aberration, astigmatism and coma are shown, and in the spherical aberration illustration, the amount of the sine condition offense is also shown by dotted line. Also, in the gradient index illustration, the gradient index of only the second order term is shown by a dotted line to show the degree of the high order term. The solid line indicates the actual gradient index.

The specifications and numerical data of Embodiment 2 will be shown below.

| NA = 0.45, WD = 2.55 mm, Maximum image height: 0.083 mm | | |
|---|---|---|
| $n_{01} = n_{02} = 1.66666$ | $g_1 = g_2 = 0.1974$ | $r_0 = 1.8$ mm |
| $h_{41} = 2.124$ | $h_{61} = -0.325$ | $z_1 = 2.215$ |
| $h_{42} = -2.476$ | $h_{62} = 4.055$ | $z_2 = 2.215$ |

Figure 4A:
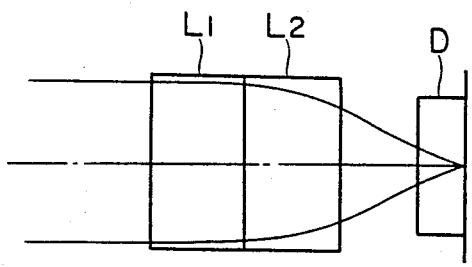
Figure 4B:
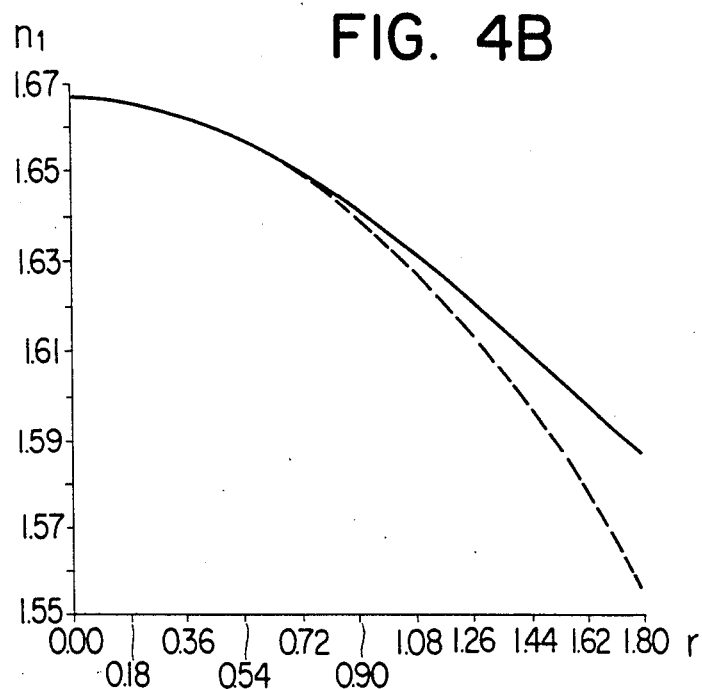
Figure 4C:
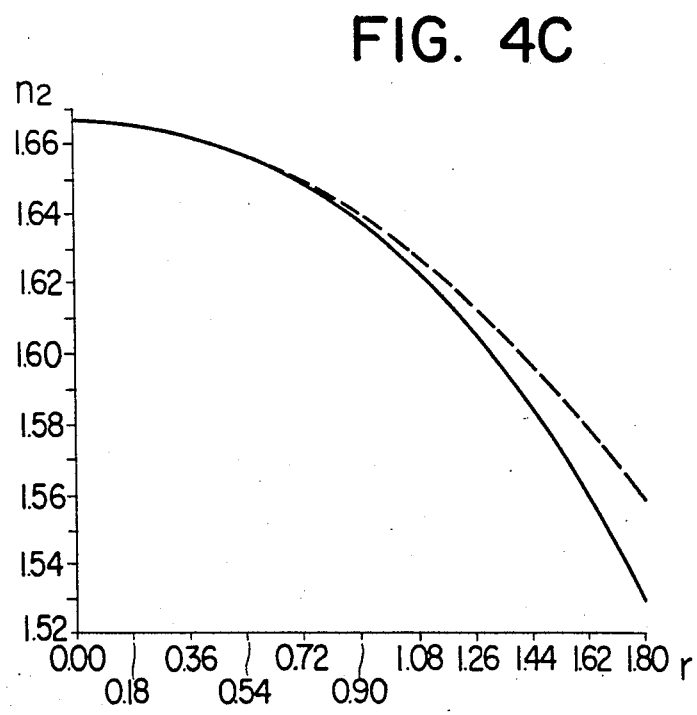
Figure 4D:
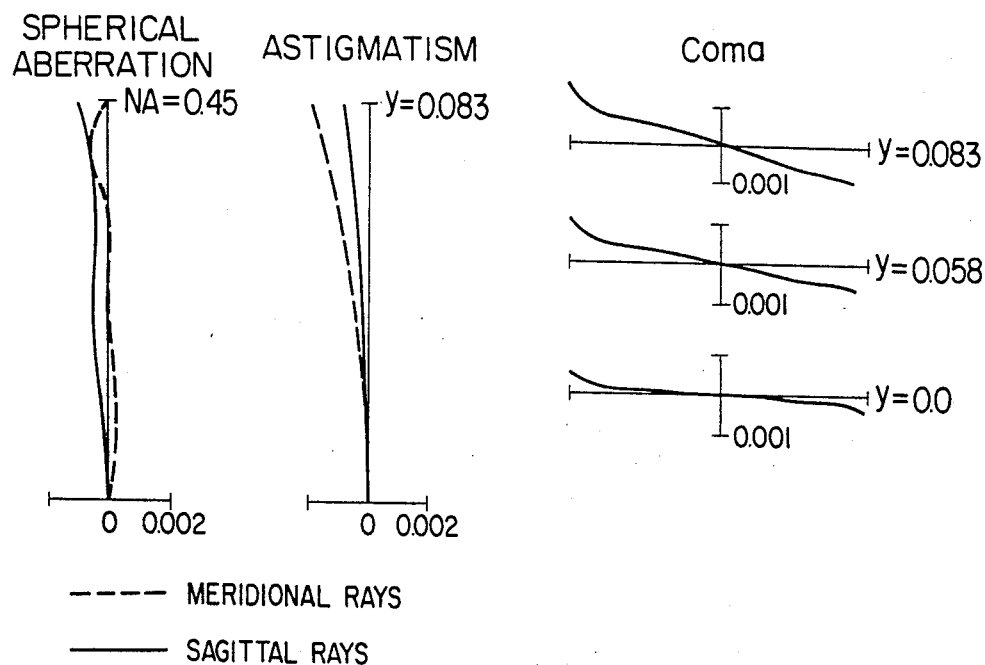
Figure 4E:
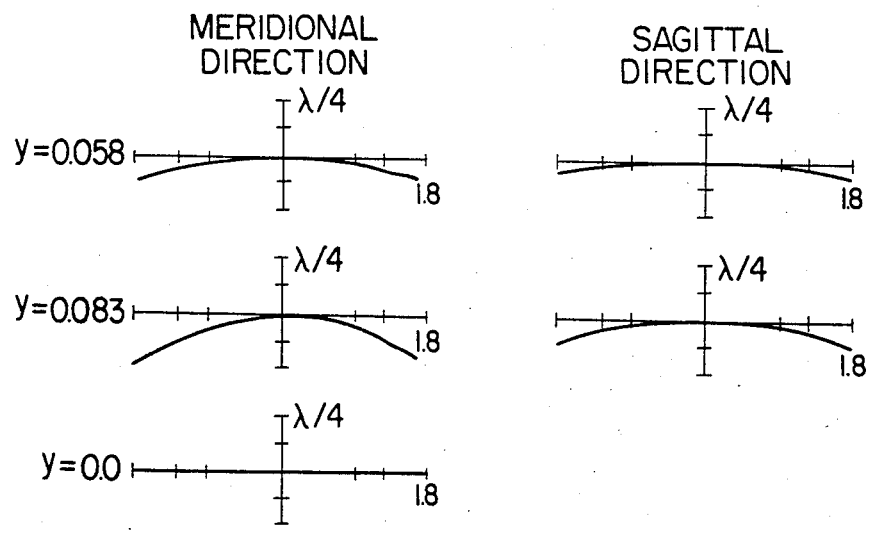

FIG. 4A shows the optical path, FIGS. 4B and 4C show the gradient indices of the first and second lenses $L_1$ and $L_2$, respectively, FIG. 4D shows ray aberrations, and FIG. 4E shows wave front aberrations. In the present embodiment, as compared with Embodiment 1, the effective radius is large and the index gradient is made correspondingly gentle.

The specifications and numerical data of Embodiment 3 will be shown below.

| NA = 0.45, WD = 2.55 mm, Maximum image height: 0.07 mm | | |
|---|---|---|
| $n_{01} = n_{02} = 1.66666$ | $g_1 = g_2 = 0.145$ | $r_0 = 2.2$ mm |
| $h_{41} = 1.860$ | $h_{61} = -0.322$ | $z_1 = 3.52$ |
| $h_{42} = -2.445$ | $h_{62} = 5.057$ | $z_2 = 3.52$ |

Figure 5A:
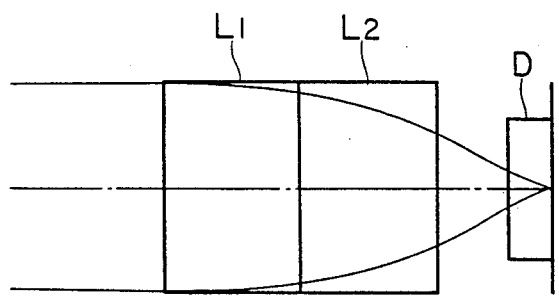
Figure 5B:
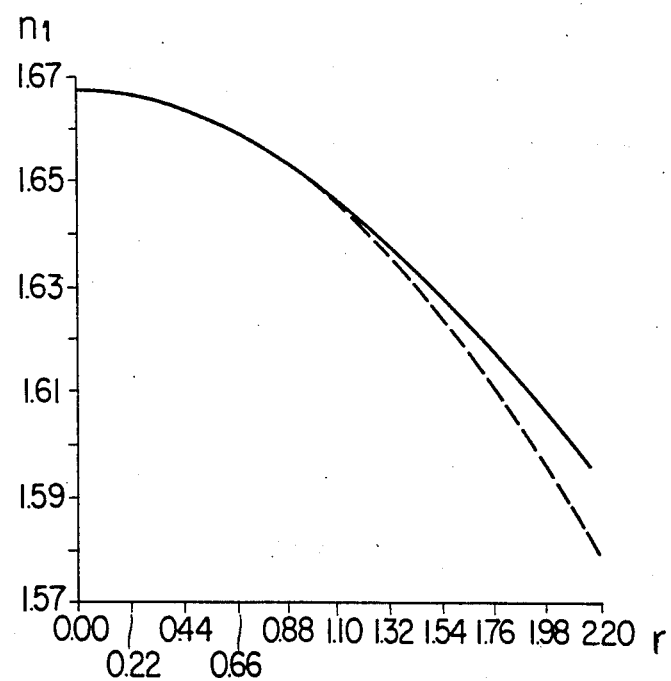
Figure 5C:
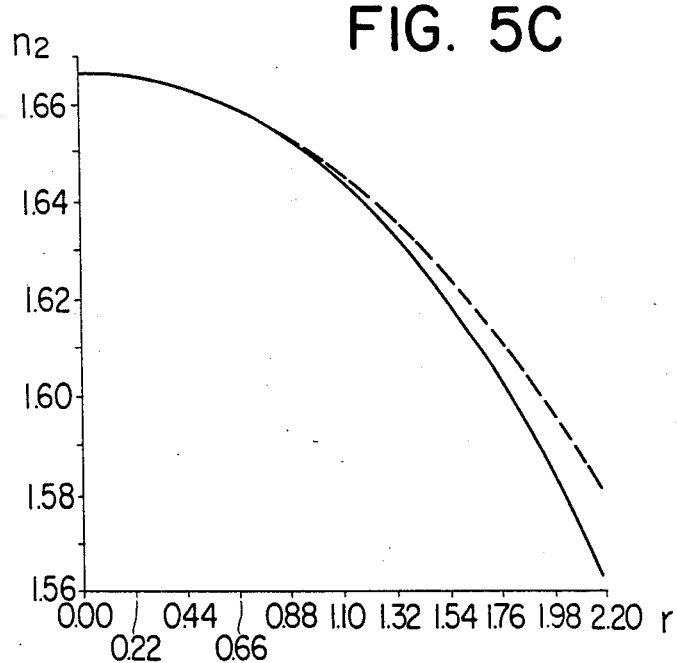
Figure 5D:
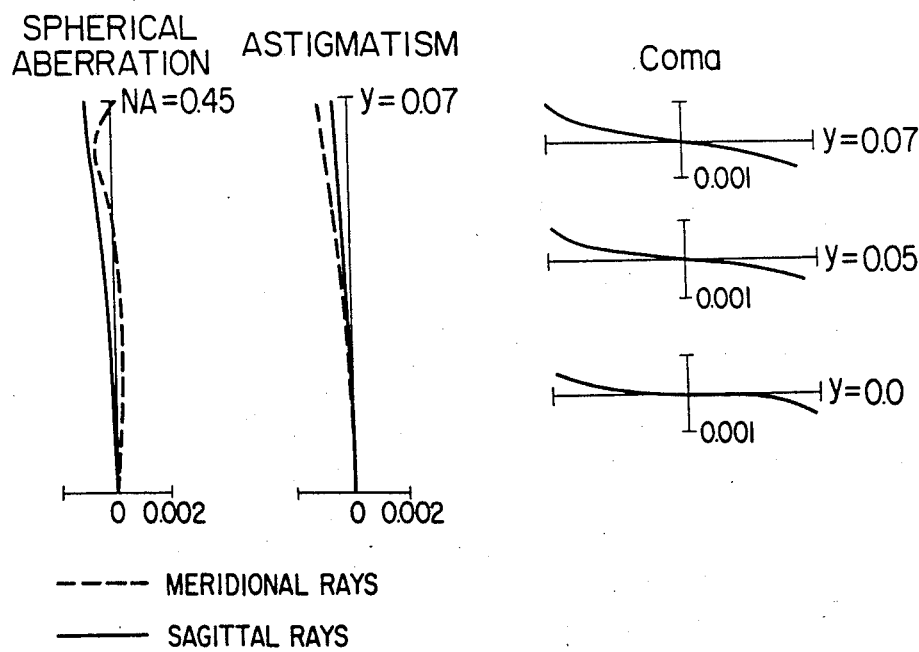
Figure 5E:
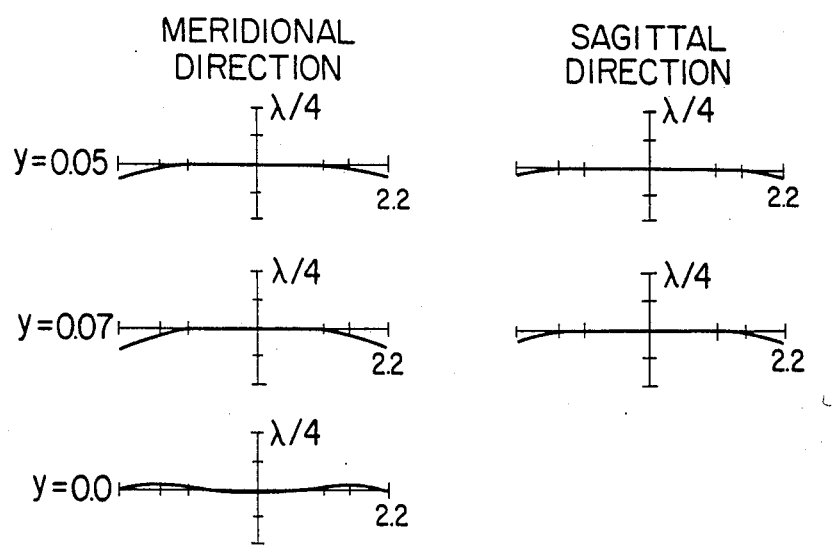

FIG. 5A shows the optical path, FIGS. 5B and 5C show the gradient indices of the first and second lenses $L_1$ and $L_2$, respectively, FIG. 5D shows ray aberrations, and FIG. 5E shows wave front abberations.

The specifications and numerical data of Embodiment 4 will be shown below.

| NA = 0.33, WD = 2.55, Maximum image height: 0.07 mm | | |
|---|---|---|
| $n_{01} = n_{02} = 1.66666$ | $g_1 = g_2 = 0.36$ | $r_0 = 1.0$ mm |
| $h_{41} = 2.607$ | $h_{61} = -0.726$ | $z_1 = 0.81$ |
| $h_{42} = -2.551$ | $h_{62} = 3.040$ | $z_2 = 0.81$ |

Figure 6A:
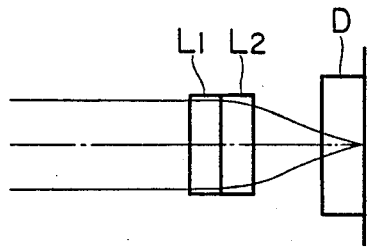
Figure 6B:
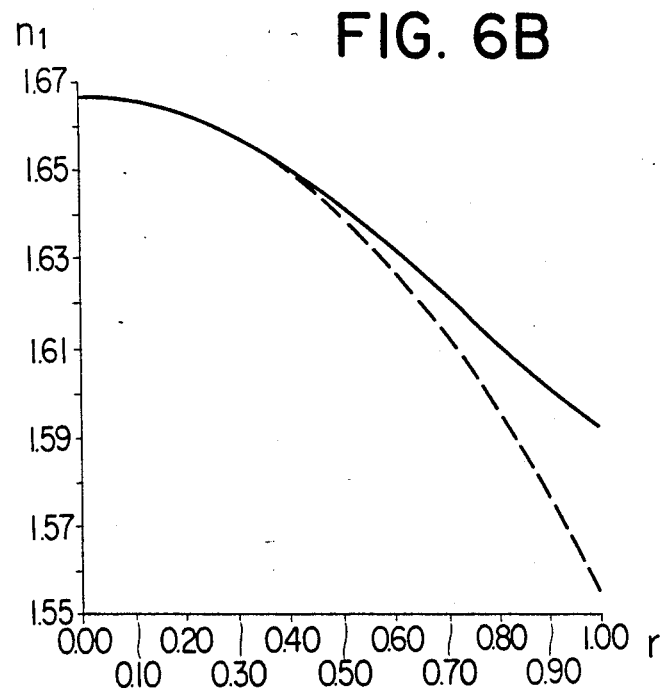
Figure 6C:
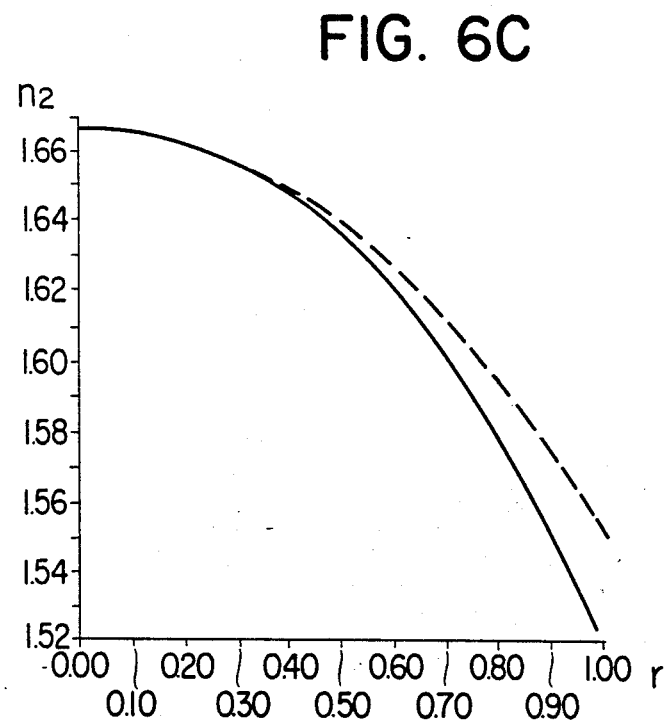
Figure 6D:
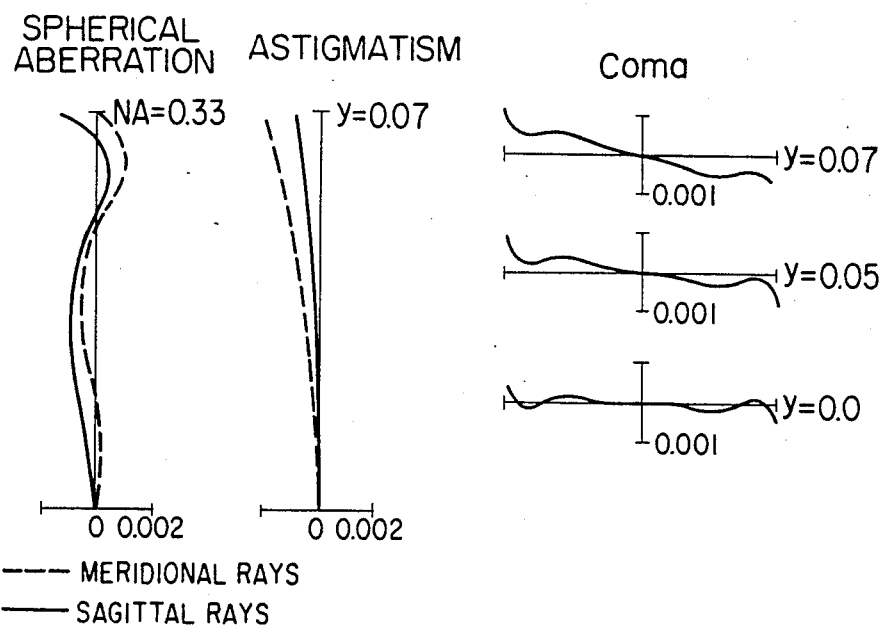
Figure 6E:
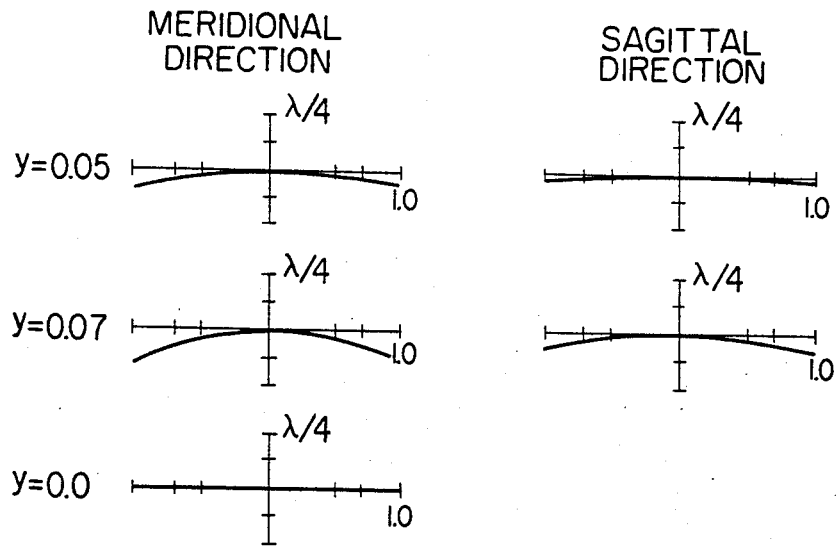

FIG. 6A shows the optical path, FIGS. 6B and 6C show the gradient indices of the first and second lenses $L_1$ and $L_2$, respectively, FIG. 6D shows ray aberrations, and FIG. 6E shows wave front aberrations. The values of the distribution characteristics $n_0$, $g$ and $r_0$ of the lens used in this embodiment are the same as those of a lens commercially available under the tradename of Selfoc Microlens. Since $r_0 = 1.0$ mm, NA can only be secured up to 0.33 from equation (8).

From each of the aberration illustrations, it is apparent that each of the embodiments of the present invention has an excellent performance as the pick-up lens for an optical disc, that as shown particularly in each of the wave front aberration illustrations, wave front aberrations are considerably smaller than $\lambda/4$ regarded as the practical standard even at the maximum image height and that coma, particularly, the symmetry thereof, is well corrected and therefore these embodiments are also excellent in the symmetry of the wave front.

In the lens system according to the present invention, spherical aberration and coma are well corrected, as mentioned above, by a combination of a plurality of gradient index lenses having different gradient indices. And further, in the present invention, if at least one of the gradient index lenses is formed by a divergent gradient index lens, it is possible to well correct curvature of field in addition to spherical aberration and coma. The construction of such a lens system will hereinafter be described in detail.

The gradient indices of a convergent gradient index lens and a divergent gradient index lens have distributions rotationally symmetrical with respect to the optical axis and are expressed, like the equations (15) and (16), by the following equations:

$$n_p^2 = n_{0p}^2\{1 - (g_p r)^2 + h_{4p}(g_p r)^4 + h_{6p}(g_p r)^6\} \quad (17)$$

$$n_n^2 = n_{0n}^2\{1 + (g_n r)^2 + h_{4n}(g_n r)^4 + h_{4n}(g_n r)^6\} \quad (18)$$

where the subscript p means an amount regarding the convergent gradient index lens, the subscript n means an amount regarding the divergent gradient index lens, $n_0$ is the center refractive index, r is the diametrical distance from the optical axis, g is a parameter indicative of the degree of refractive index gradient, and $h_4$ and $h_6$ are the coefficients of the fourth order term and the sixth order term as the high order terms of the gradient index.

Also, if restricted to the paraxial area, the aforementioned equation (2) can be analytically solved and the following paraxial ray pursuit formulas are obtained:

$$\begin{pmatrix} h \\ \alpha \end{pmatrix} = \begin{pmatrix} \cos g_p z_p & -\dfrac{1}{n_{0p}g_p}\sin g_p Z_p \\ n_{0p}g_p \sin g_p Z_p & \cos g_p Z_p \end{pmatrix} \begin{pmatrix} h_0' \\ \alpha_0' \end{pmatrix} \quad (19)$$

$$\begin{pmatrix} h \\ \alpha \end{pmatrix} = \begin{pmatrix} \cos h\, g_n Z_n & -\dfrac{1}{n_{0n}g_n}\sin h\, g_p Z_p \\ -n_{0n}g_n \sin h\, g_n Z_n & \cos h\, g_n Z_n \end{pmatrix} \begin{pmatrix} h_0' \\ \alpha_0' \end{pmatrix} \quad (20)$$

Equation (19) is concerned with the convergent gradient index lens and equation (20) is concerned with the divergent gradient index lens. In these equations, symbols are similar to those in equation (3) and are as shown in FIG. 1.

First, assume the construction of a lens system in which, in succesion from the object side, a divergent gradient index lens $L_n$ and a convergent gradient index lens $L_p$ are arranged in intimate contact with each other. Consider that when the distribution characteristics $n_0$ and g and the effective radius $r_0$ of the two gradient index lenses are given, the lengths $Z_n$ and $Z_p$ of the two lenses are determined so as to satisfy the numerical aperture NA and working distance WD which are the specifications of the pick-up lens system. Since the incident laser beam is a parallel beam, the converted paraxial incidence inclination $\alpha_0$ is 0 and therefore, the paraxial imaging formula is expressed as:

$$\begin{pmatrix} h \\ \alpha \end{pmatrix} = \begin{pmatrix} \cos g_p Z_p & -\dfrac{1}{n_{0p}g_p}\sin g_p Z_p \\ n_{0p} \sin g_p Z_p & \cos g_p Z_p \end{pmatrix} \quad (21)$$

$$\begin{pmatrix} \cos h\, g_n Z_n & -\dfrac{1}{n_{0n}g_n}\sin h\, g_n Z_n \\ -n_{0n}g_n \sin h\, g_n Z_n & \cos h\, g_n Z_n \end{pmatrix} \begin{pmatrix} h_0 \\ 0 \end{pmatrix}$$

If it is assumed that the focal length of the lens system is f, $$f = h_0/\alpha \quad (22)$$

and $$WD = h/\alpha \quad (23)$$

If it is further assumed that coma is corrected and the sine condition is satisfied, the following equation is established:

$$NA = r_0/f \quad (24)$$

From the foregoing equations (21)–(24), the following two relations are obtained between the gradient index characteristic and the specifications NA, WD:

$$n_{0p}g_p \cos h\, g_n Z_n \sin g_p Z_p - n_{0n}g_n \sin h\, g_n Z_n \cos g_n Z_n = \frac{NA}{r_0} \quad (25)$$

$$n_{0p}g_p \cos h\, g_n Z_n \cos g_p Z_p + \quad (26)$$
$$n_{0n}g_n \sin h\, g_n Z_n \sin g_p Z_p = NA\ WD\ n_{0p}g_p/r_0$$

If $Z_n$ and $Z_p$ are solved from equations (25) and (26), $$Z_n = \frac{1}{2g_n} \cos h^{-1}\left[\left\{(n_{0n}g_n)^2 - (n_{0p}g_p)^2 + 2\left(\frac{NA}{r_0}\right)^2(1 + WD^2 n_{0p}^2 g_p^2)\right\} / \{(n_{0n}g_n)^2 + (n_{0p}g_p)^2\}\right] \quad (27)$$

$$Z_p = \frac{1}{g_p} \tan^{-1}\left[(1 + d_0 n_{0n} g_n \tan h\, g_n Z_n)/\left(WD\, n_{0p}g_p - \frac{n_{0n}g_n}{n_{0p}g_p} \tan h\, g_n Z_n\right)\right] \quad (28)$$

That is, when the specifications NA and WD of the pick-up lens system and the gradient index characteristics $n_{0n}$, $g_n$, $n_{0p}$, $g_p$ and $r_0$ of the two lenses are given, the lengths $Z_n$ and $Z_p$ of the two lenses are primarily determined. Even where the lenses $L_n$ and $L_p$ are not cemented lenses but are separated from each other by a suitable spacing $Z_0$, $Z_n$ and $Z_p$ can be primarily determined from the gradient index characteristics and the specifications by the same concept.

The contribution provided by the presence of the gradient index of the Petzval sum P which is an important parameter indicative of the degree of curvature of field is as follows with respect to the lenses $L_n$ and $L_p$:

$$P_n = -\frac{g_n^2 Z_n}{n_{0n}}$$

$$P_p = \frac{g_p^2 Z_p}{n_{0p}}$$

(see JOSA, Vol. 60, No. 11, p. 1436). Assuming that each end surface is planar, the contributing component by the refraction in the end surface is zero and after all, the Petzval sum P of the entire system is $$P = P_n + P_p.$$

Apparently, $P_p > 0$ and $P_n < 0$ and therefore, by using a divergent gradient index lens, the Petzval sum can be decreased and the planarity of the image plane can be realized. That is, the degree of curvature of field is independent of the high order terms of the gradient index and is determined by the selection of basic parameters such as the coefficient g which governs the distribution near the center of the lens, the center refractive index $n_0$ and the length Z of the lens.

Since a pick-up lens for an optical disc is required to condense a laser beam into a minute spot of $1.5\mu$ or less, NA of a value of 0.45 or more is required. Also, since the information recorded on the back surface of a disc of plastics having a thickness of the order of 1.1 mm is read from the front surface thereof by applying a laser beam thereto, a working distance (back focal length) of 2.6 mm or more converted in terms of air is required. Further, in a pick-up lens for an optical disc of the tracking type using two light beams (the twin beam method), the planarity of the image plane within an image circle of 0.3-0.4 mm is required. A gradient index lens is made as by the ion exchange method, but if the effective radius $r_0$ thereof is too great, the manufacture thereof will become difficult and it will also become impossible to make the lens compact and light in weight. Accordingly, $r_0 = 1-2$ mm would be considered suitable. The center refractive index is an amount determined by the material of the lens and may be of the order of 1.5 to 1.7 and thus, has not so great a degree of freedom. Accordingly, the parameters which can be selected relatively freely are three amounts, i.e., $g_n$, $g_p$ and $Z_0$.

However, it is desirable for the reason set forth below that $g_n$, $g_p$ and $Z_0$ satisfy the following conditions:

$$0.1 < g_p < 0.3 \quad (29)$$

$$0.1 < g_n < 0.3 \quad (30)$$

$$0 \leq Z_0 < 3.0 \quad (31)$$

That is, if the value of $g_p$ exceeds the lower limit of condition (29), the length $Z_p$ of the convergent gradient index lens $L_p$ given by equations (27) and (28) will become too great and inconveniently, the weight and shape thereof will become great and at the same time, when the high order gradient indices of two lenses are determined so that spherical aberration and coma are corrected, astigmatism will be aggravated and the meridional curvature of field will be greatly bent in the positive direction. If the value of $g_p$ exceeds the upper limit of condition (29), the difference in refractive index between the center and the marginal portion of the lens will become too great and the manufacture of the lens will become very difficult. Also, the Petzval sum will become too positive and therefore, the image plane will be bent too much in the negative direction and it will become impossible to maintain the planarity of the image plane.

If the value of $g_n$ exceeds the lower limit of condition (30), the length $Z_n$ of the lens $L_n$ given by equation (27) will become too great and the lens cannot be made compact and light in weight. Also, when the high order gradient indices of the two lenses are determined so that spherical aberration and coma are corrected, astigmatism will be aggravated and the meridional curvature of field will become substantial in the positive direction. If the value of $g_n$ exceeds the upper limit of condition (30), the difference in refractive index between the center and the marginal portion of the lens $L_n$ will become too great and the manufacture of the lens will become very difficult. Also, astigmatism will be aggravated and the meridional curvature of field will become great in the negative direction. If $Z_0$ exceeds the upper limit of condition (31), astigmatism will be aggravated and the meridional image plane will be greatly bent in the positive direction and it will be impossible to maintain the planarity of the image plane.

In order that the severe aberration correcting conditions of a pick-up lens for optical disc may be satisfied, both of spherical aberration and coma must be corrected well and it is desirable that the following conditions be satisfied in respect of high order gradient index constants:

$$0 < h_{4p} < 1.0$$

$$-1.0 < h_{6p} < 1.5$$

$$0.0 < h_{4n} < 10.0$$

$$-1.0 < h_{6n} < 15.0$$

If any of the upper limits and the lower limits of the above conditions is exceeded, it will become impossible to correct spherical aberration and coma at a time.

Some embodiments having a divergent gradient index lens will now be described. In each of these embodiments, as in the aforedescribed embodiments, the thickness of the optical disc D is 1.1 mm, the material thereof is plastics and the refractive index thereof is 1.48546. The aberrations are also corrected with respect to a light ray of oscillation wavelength $\lambda = 780$ nm of the semiconductor laser.

Figure 7A:
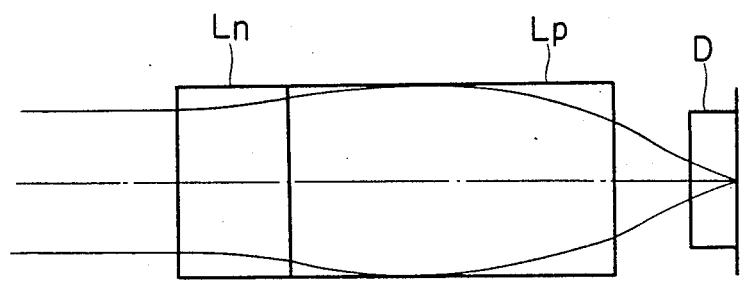
FIGS. 7 to 11 relate to fifth to ninth embodiments of the present invention, FIGS. 7A, 8A, 9A, 10A and 11A being optical path illustrations, FIGS. 7B, 8B, 9B, 10B and 11B being graphs showing the gradient index of a divergent lens, FIGS. 7C, 8C, 9C, 10C and 11C being graphs showing the gradient index of a convergent lens, FIGS. 7D, 8D, 9D, 10D and 11D showing ray aberrations, and FIGS. 7E, 8E, 9E, 10E and 11E showing wave front aberrations.

Embodiment 5, as shown in FIG. 7A, is an example of the design which comprises a divergent gradient index lens $L_n$ and a convergent gradient index lens $L_p$ brought into intimate contact with each other, and the numeral data thereof are as follows:

| NA = 0.464, WD = 2.6 mm, $r_0$ = 1.53 mm Maximum image height: 0.185 mm Focal length: 3.3 mm | | |
|---|---|---|
| | Divergent lens $L_n$ | Convergent lens $L_p$ |
| Lens length Z | 2.60 | 7.67 |
| Center refractive index | 1.56 | 1.66666 |
| g | 0.2 | 0.18 |
| $h_4$ | 0.988 | 0.287 |
| $h_6$ | 0.886 | 0.053 |

Figure 7B:
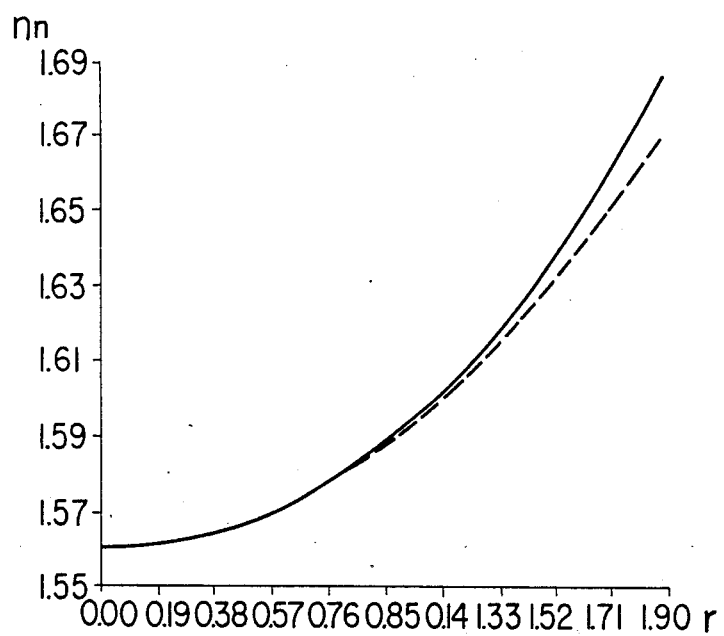
Figure 7C:
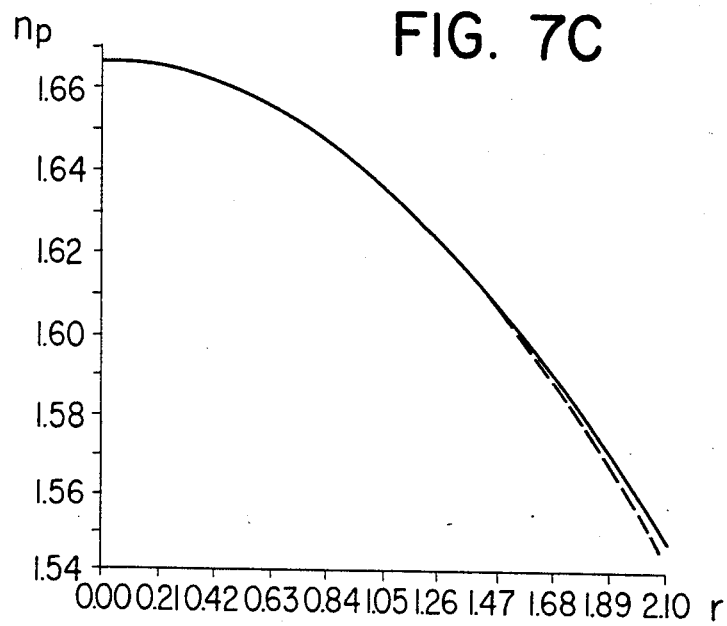
Figure 7D:
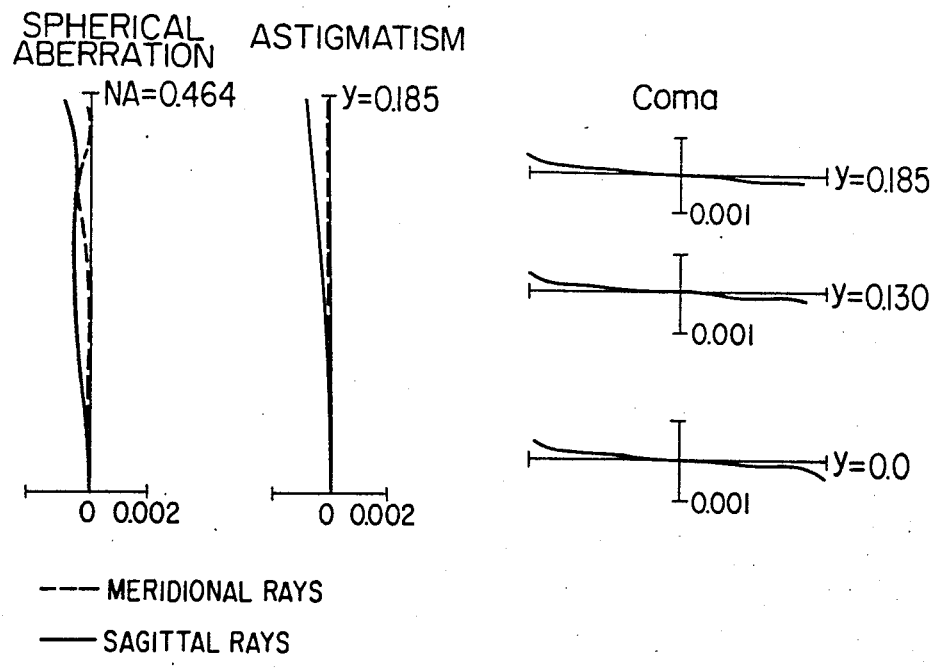
Figure 7E:
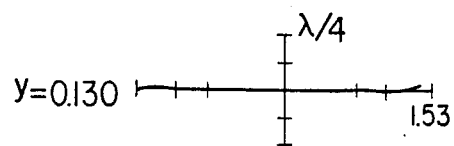
Figure 7E:
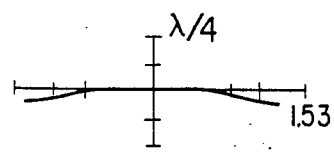
Figure 7E:
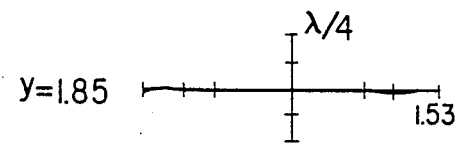
Figure 7E:
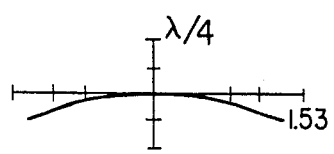
Figure 7E:
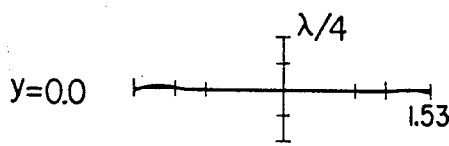

The incidence height of the on-axis marginal ray of NA=0.464 is $r_0$=1.53, but the light beam is once widened by the divergent lens and therefore, the substantial effective radius of each lens is about 2 mm. FIG. 7A is an optical path illustration in which the light ray from the on-axis object point is shown. FIG. 7B shows the gradient index of the divergent lens $L_n$, and FIG. 7C shows the gradient index of the convergent lens $L_p$. In each of these gradient index graphs, the solid line represents the actual distribution and the dotted line represents the gradient index of only the second order term to show the degree of high order term. FIG. 7D shows ray aberrations, and FIG. 7E shows wave front aberrations. In the ray aberration illustration, spherical aberration, astigmatism and coma are shown and, in the spherical aberration illustration, the amount of the sine condition offense is also indicated by dotted line.

Embodiment 6 also comprises a divergent gradient index lens $L_n$ and a convergent gradient index lens $L_p$ cemented together, and the numerical data thereof will be shown below. The specifications of this embodiment are entirely the same as those of Embodiment 5.

| | Divergent lens $L_n$ | Convergent lens $L_p$ |
|---|---|---|
| Lens length Z | 4.49 | 5.69 |
| Center refractive index $n_0$ | 1.56 | 1.66666 |
| g | 0.12 | 0.2 |
| $h_4$ | 3.835 | 0.256 |
| $h_6$ | 8.487 | 0.029 |

Figure 8A:
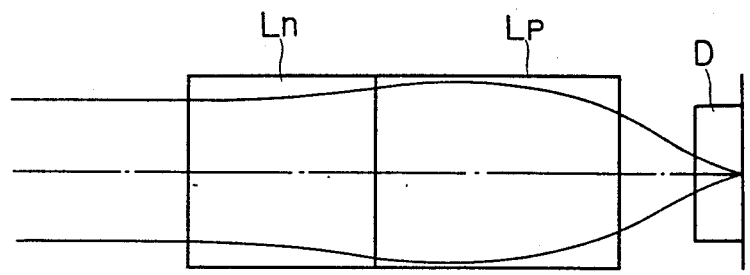
Figure 8B:
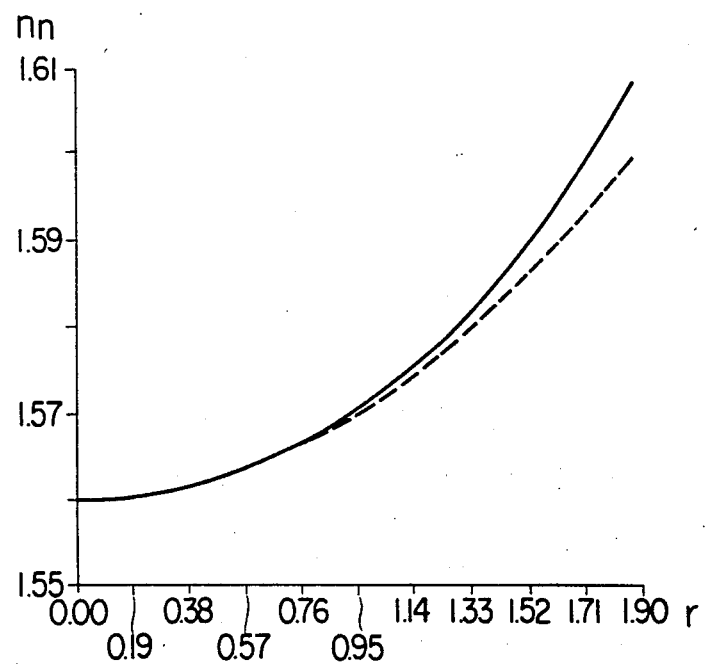
Figure 8C:
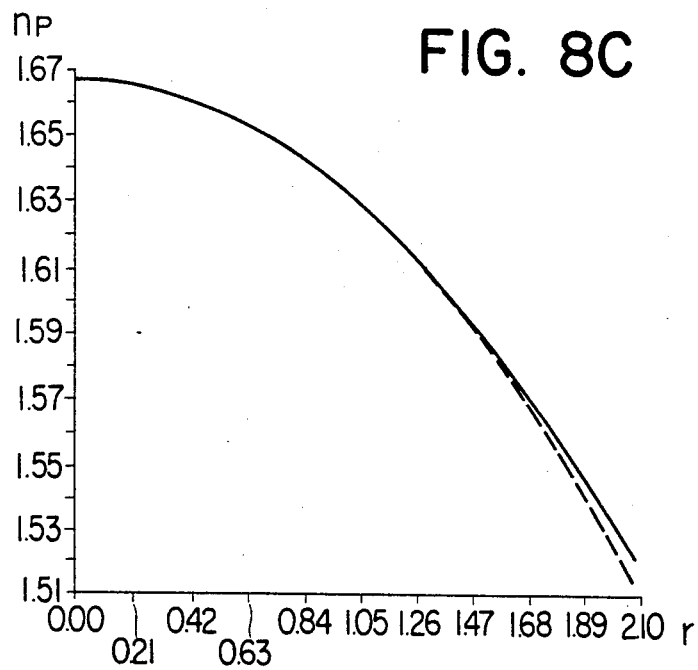
Figure 8D:
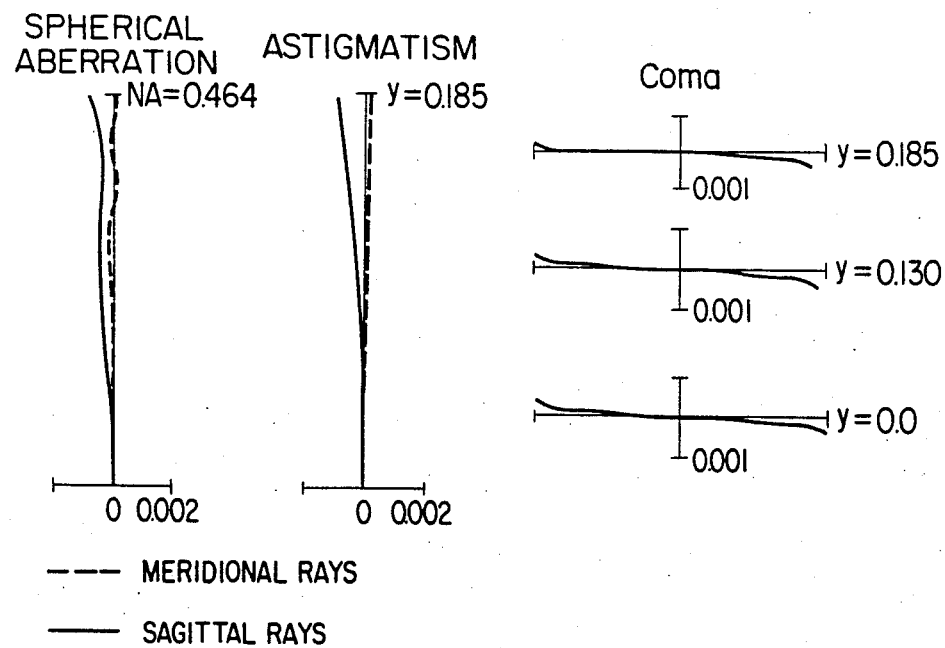
Figure 8E:
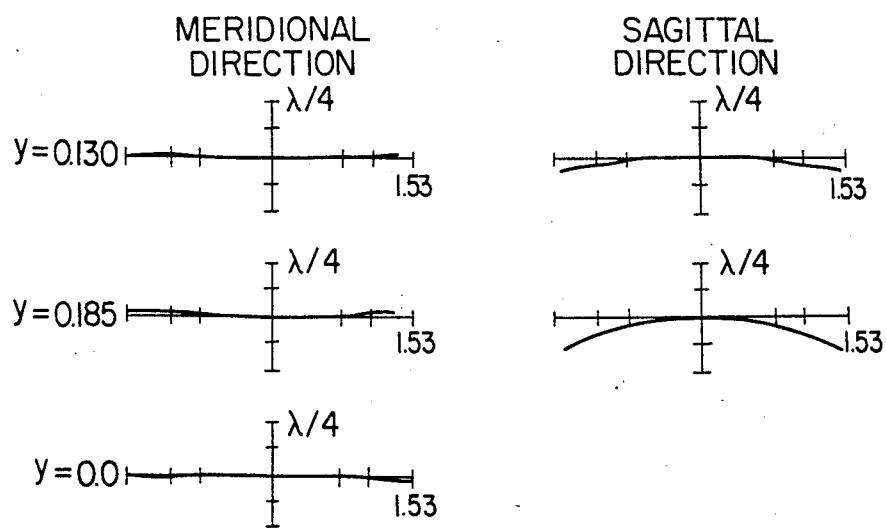

FIG. 8A shows the optical path of the Embodiment 6, FIG. 8D shows the gradient index of the divergent lens $L_n$, and FIG. 8C shows the gradient index of the convergent lens $L_p$. FIG. 8D shows ray aberrations, and FIG. 8E shows wave front aberrations.

Embodiment 7, like the above-described embodiment, comprises a divergent and a convergent gradient index lens cemented together, and the numerical data thereof are as shown below.

| NA = 0.4 WD = 2.6 mm $r_0$ = 1.15 mm Maximum image height: 0.185 mm f = 2.5 mm | | |
|---|---|---|
| | Divergent lens $L_n$ | Convergent lens $L_p$ |
| Lens length Z | 3.67 | 5.13 |
| Center refractive index $n_0$ | 1.56 | 1.66666 |
| g | 0.2 | 0.24 |
| $h_4$ | 1.441 | 0.286 |
| $h_6$ | 1.669 | 0.022 |

Figure 9A:
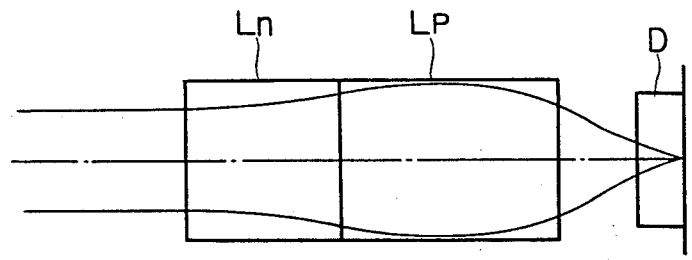
Figure 9B:
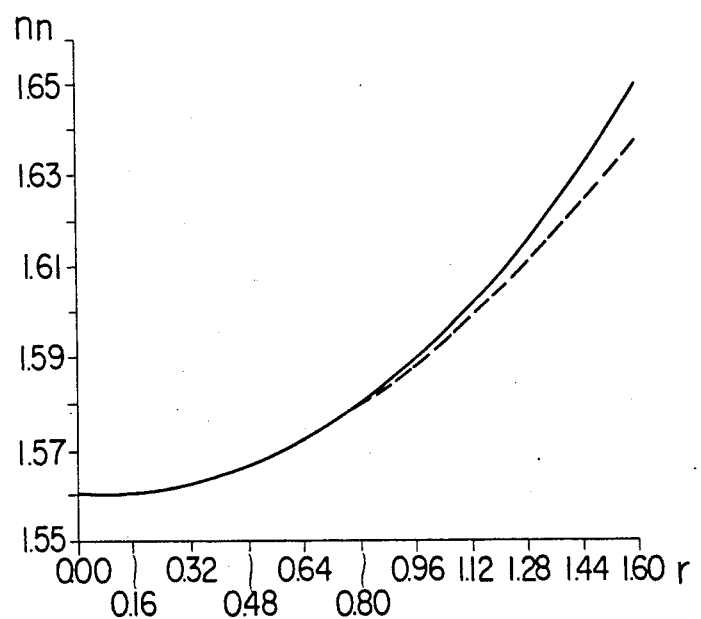
Figure 9C:
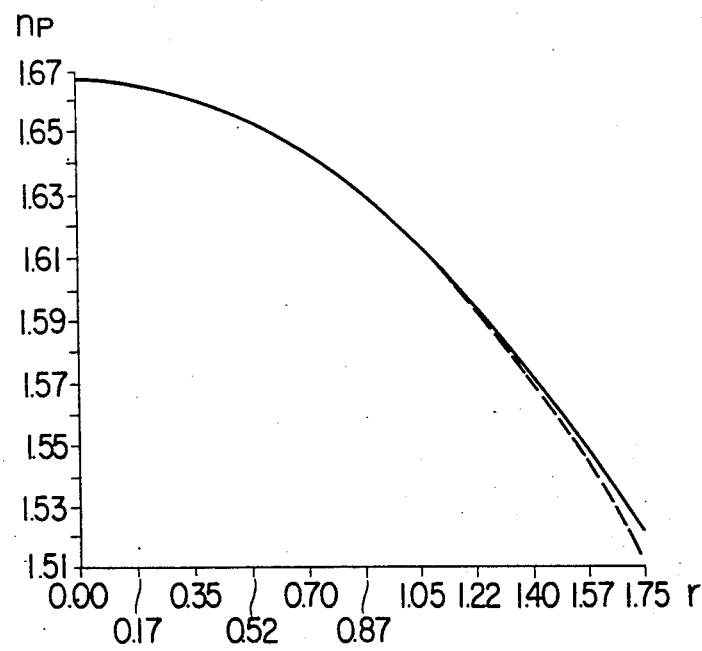
Figure 9D:
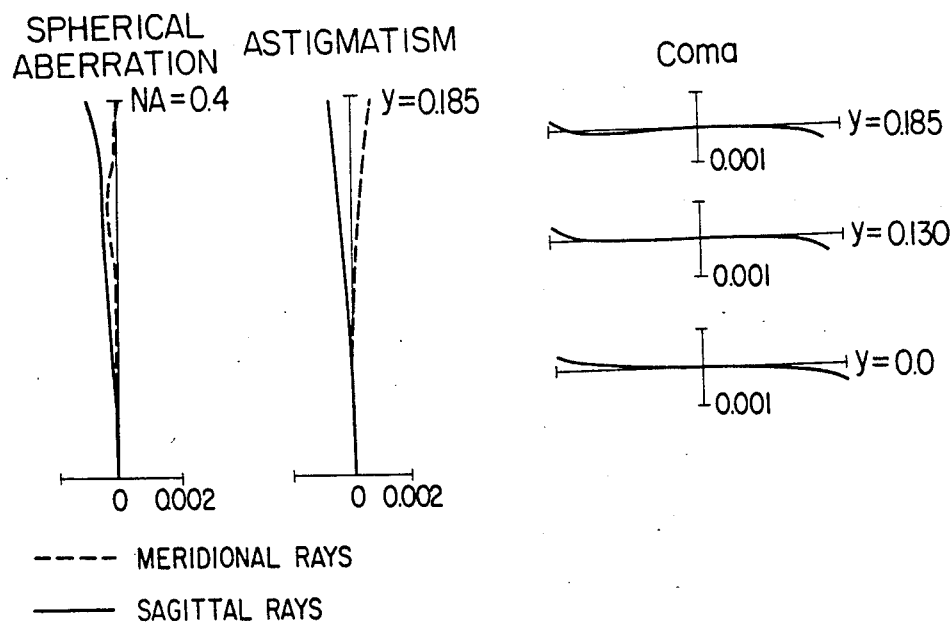
Figure 9E:
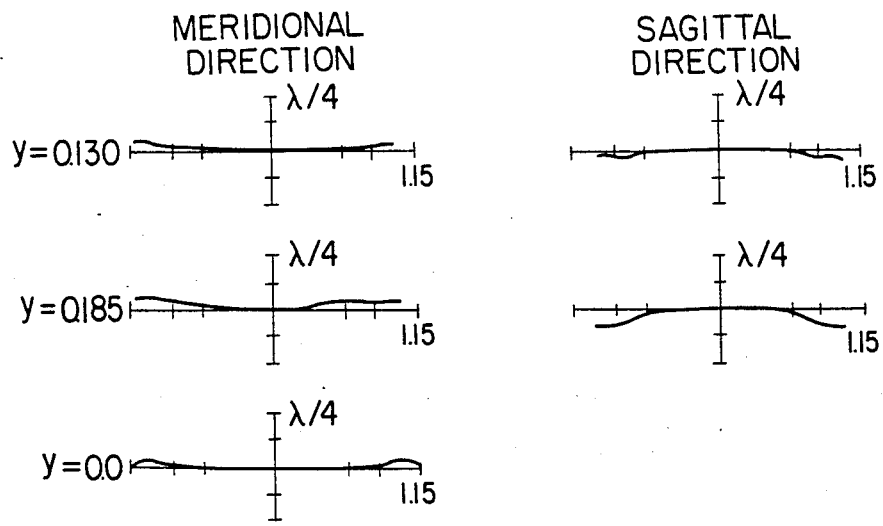

FIG. 9A shows the optical path of the Embodiment 7, and FIGS. 9B and 9C show the gradient indices of the divergent lens $L_n$ and the convergent lens $L_p$, respectively. FIG. 9D shows ray aberrations, and FIG. 9E shows wave front aberrations.

The numerical data of Embodiment 8 will be shown below. The specifications of this embodiment are entirely the same as those of Embodiment 7.

| | Divergent lens $L_n$ | Convergent lens $L_p$ |
|---|---|---|
| Lens length Z | 2.47 | 4.71 |
| Center refractive index $n_0$ | 1.56 | 1.66666 |
| g | 0.26 | 0.26 |
| $h_4$ | 1.045 | 0.255 |
| $h_6$ | 0.830 | 0.061 |

Figure 10A:
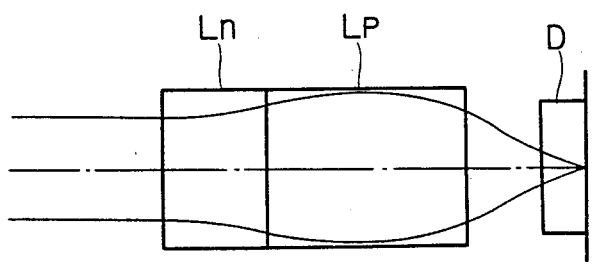
Figure 10B:
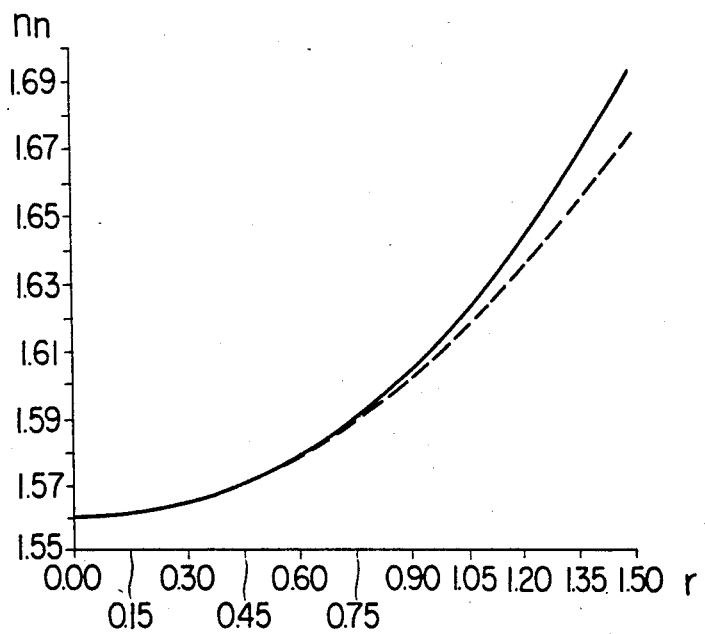
Figure 10C:
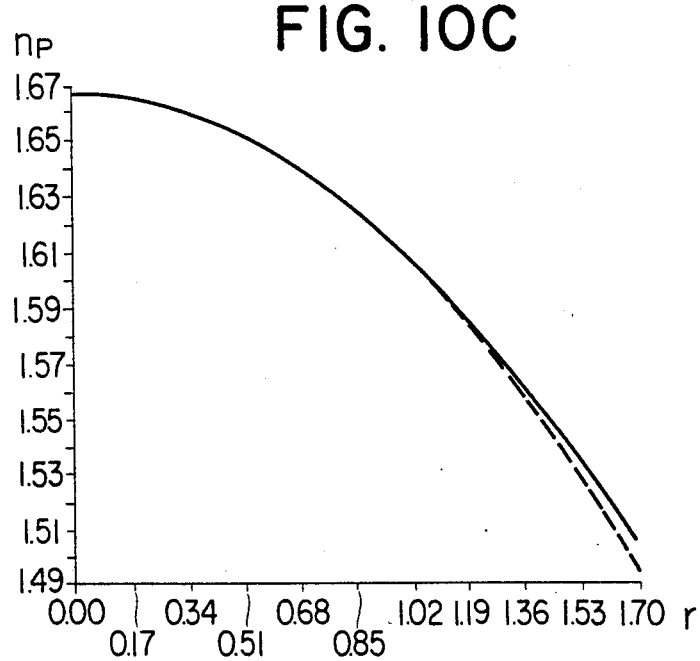
Figure 10D:
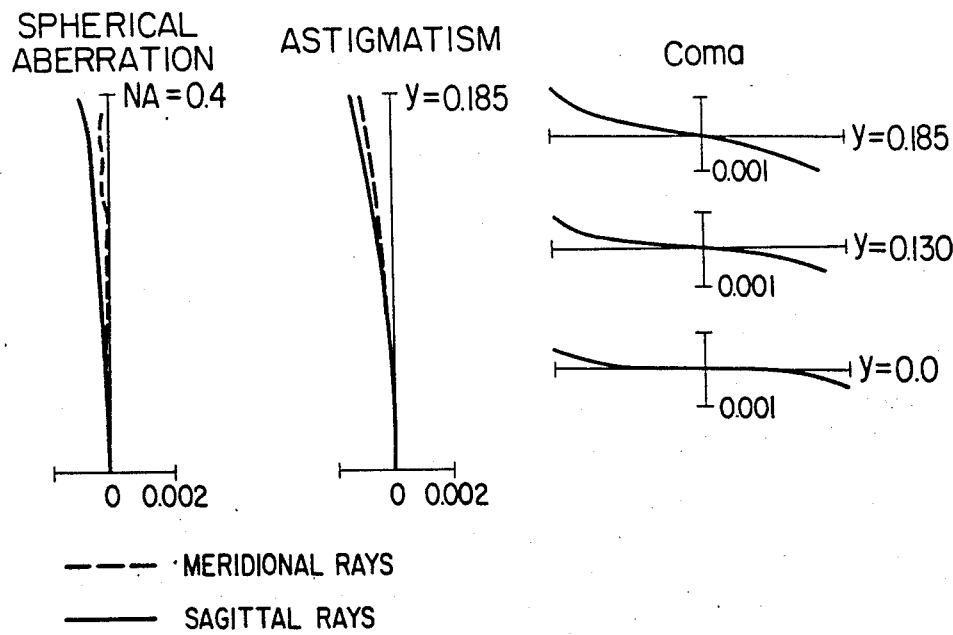
Figure 10E:
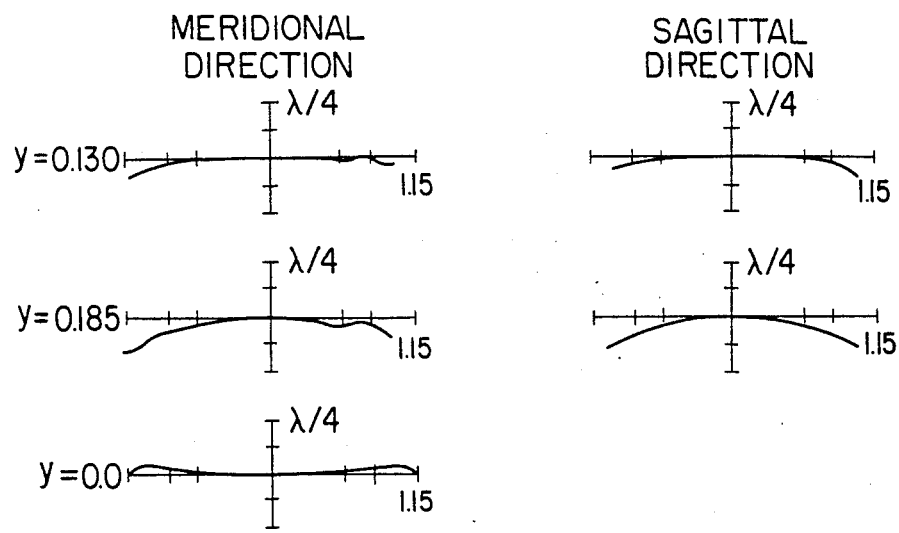

FIG. 10A shows the optical path of the Embodiment 8, and FIGS. 10B and 10C show the gradient indices of the divergent lens $L_n$ and the convergent lens $L_p$, respectively. FIG. 10D shows ray aberrations, and FIG. 10E shows wave front aberrations.

The numerical data of Embodiment 9 will be shown below.

| NA = 0.464 WD = 2.6 mm $r_0$ = 1.53 mm Maximum image height: 0.185 mm f = 3.3 mm $Z_0$ = 1.8 mm | | |
|---|---|---|
| | Divergent lens $L_n$ | Convergent lens $L_p$ |
| Lens length Z | 0.91 | 4.36 |
| Center refractive index $n_0$ | 1.56 | 1.66666 |
| g | 0.2 | 0.22 |
| $h_4$ | 2.661 | 0.286 |
| $h_6$ | 4.133 | 0.006 |

Figure 11A:
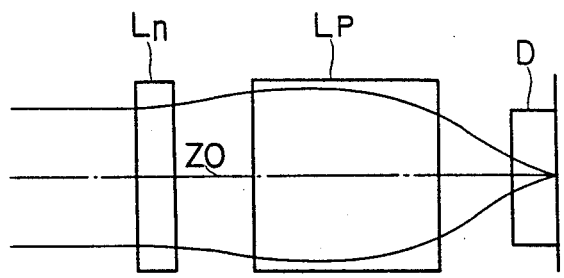
Figure 11B:
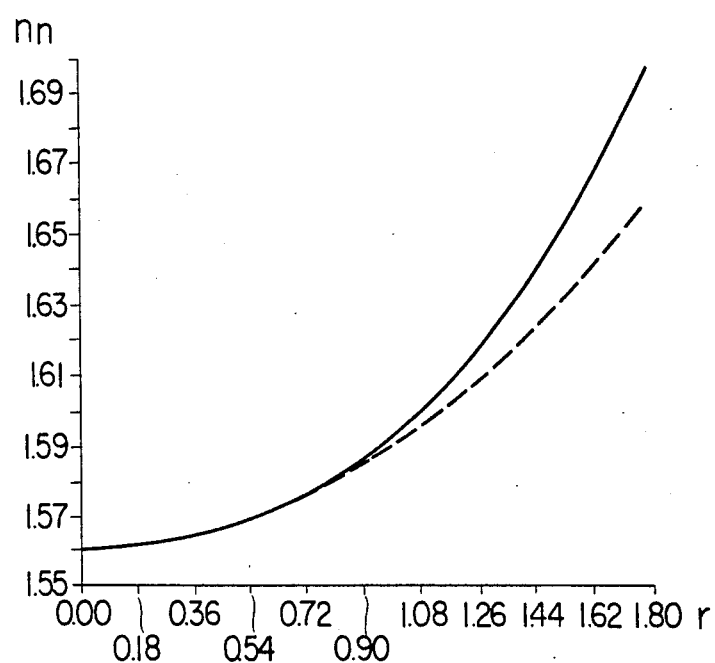
Figure 11C:
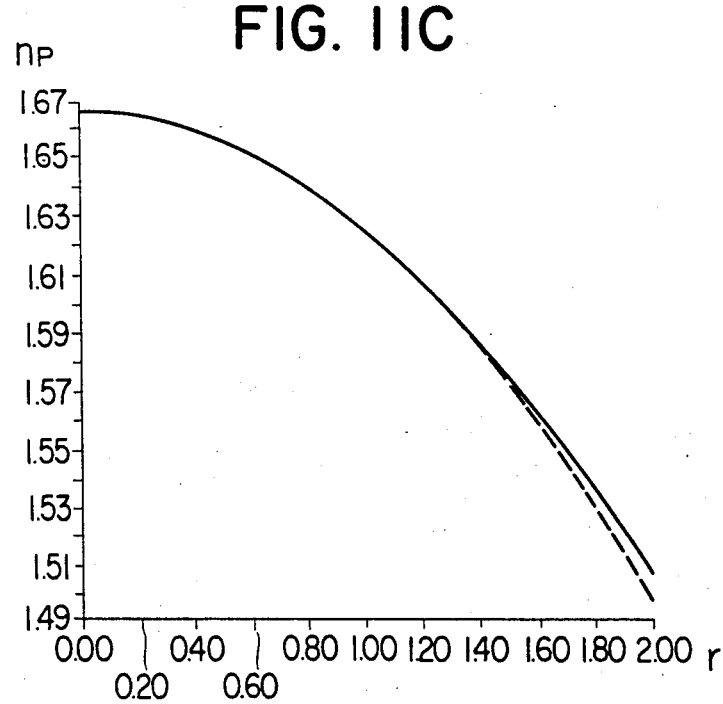
Figure 11D:
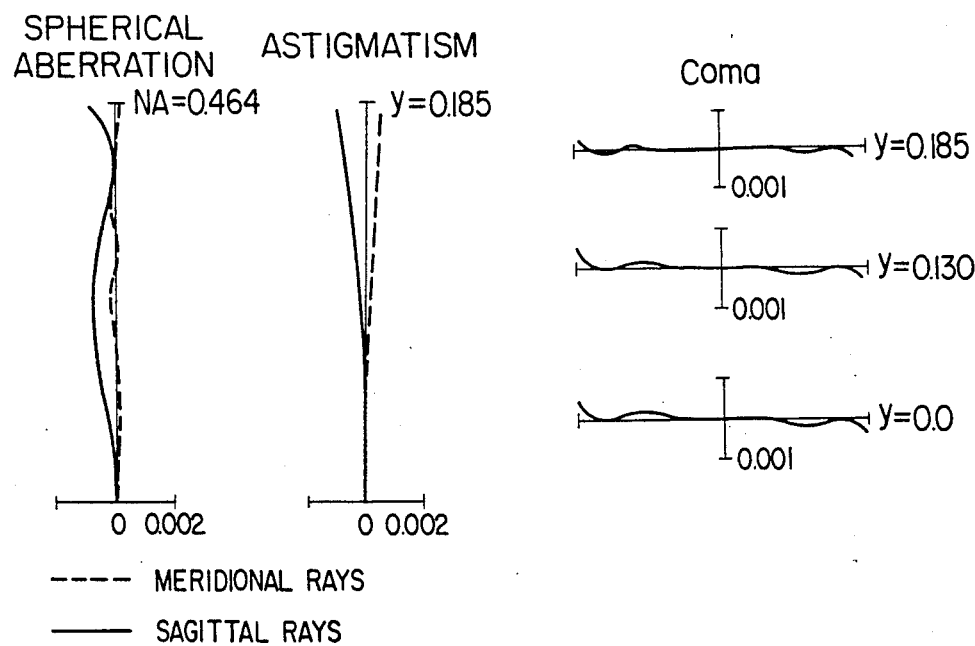
Figure 11E:
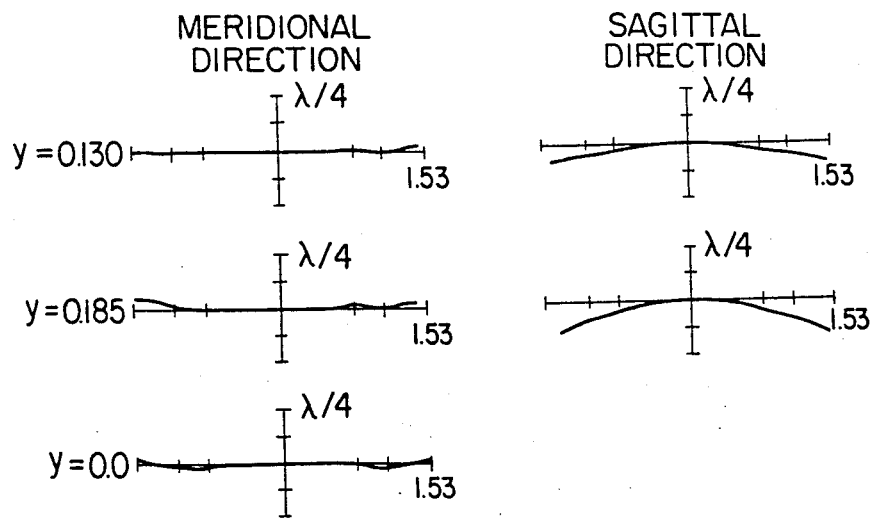

In the present embodiment, as shown in FIG. 11A, the divergent gradient index lens $L_n$ and the convergent gradient index lens $L_p$ are separate from each other by $Z_0$=1.8 mm. Since the thickness of the divergent lens $L_n$ is small, the negative component of the Petzval sum is small and the Petzval sum of the entire system is somewhat great, but by securing a wide spacing between the two lenses, astigmatism is purposely created to keep balance between the meridional curvature of field and the saggital curvature of field. FIG. 11A shows the optical path of the Embodiment 9, FIGS. 11B and 11C show the gradient indices of the divergent lens $L_n$ and the convergent lens $L_p$, respectively, FIG. 11D shows ray aberrations, and FIG. 11E shows wave front aberrations.

The numerical data of embodiment 10 will be shown below.

NA = 0.464 WD = 2.6 mm $r_0$ = 1.53 mm
Maximum image height: 0.185 mm f = 3.3 mm

|  | Divergent lens $L_n$ | 1st convergent lens $L_{p1}$ | 2nd convergent lens $L_{p2}$ |
|---|---|---|---|
| Lens length Z | 1.96 | 2.56 | 2.56 |
| Center refractive index $n_0$ | 1.56 | 1.66666 | 1.66666 |
| g | 0.2 | 0.22 | 0.22 |
| $h_4$ | 2.898 | −0.547 | 0.740 |
| $h_6$ | 2.115 | 1.089 | −0.851 |

Figure 12A:
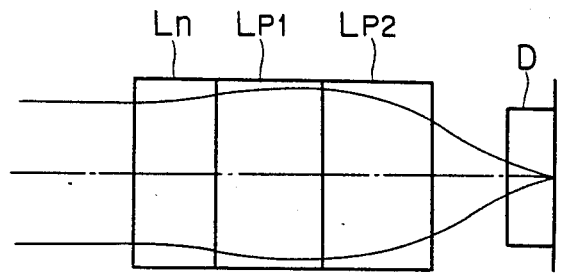
FIGS. 12 and 13 relate to tenth and eleventh embodiments of the present invention, FIGS. 12A and 13A being optical path illustrations, FIGS. 12B and 13B being graphs showing the gradient index of a divergent lens, FIGS. 12C and 13C being graphs showing the gradient index of a first convergent lens, FIGS. 12D and 13D being graphs showing the gradient index of a second convergent lens, and FIGS. 12E and 13E showing ray aberrations, and FIGS. 12F and 13F showing wave front aberrations.

The present embodiment, as shown in FIG. 12A, comprises a divergent lens $L_n$ and first and second convergent lenses $L_{p1}$ and $L_{p2}$ cemented to the divergent lens, i.e., a total of three gradient index lenses. The value of g is great in spite of the value of $r_0$ being great and therefore, the lens length can be made relatively small. If the first and second convergent lenses $L_{p1}$ and $L_{p2}$ are integral with each other and of the same gradient index, the Petzval sum will become somewhat great and moreover, if spherical aberration and coma are corrected, astigmatism will also become relatively small and the meridional and sagittal image planes will become coincident with the Petzval image plane and the planarity of the image plane will be lost.

Figure 12B:
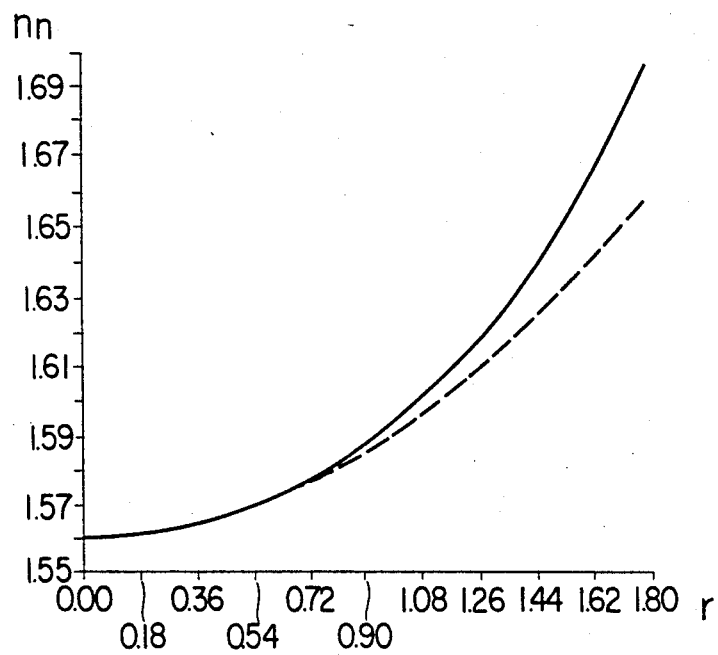
Figure 12C:
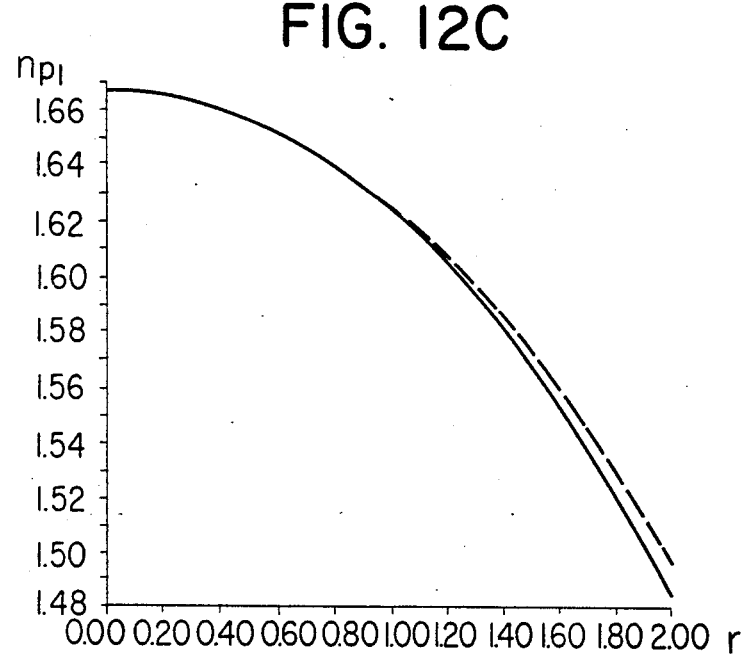
Figure 12D:
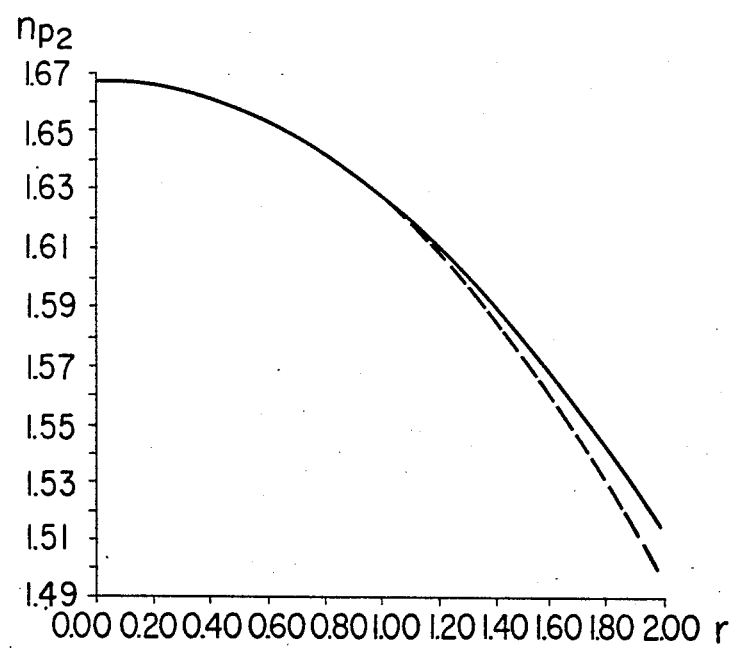
Figure 12E:
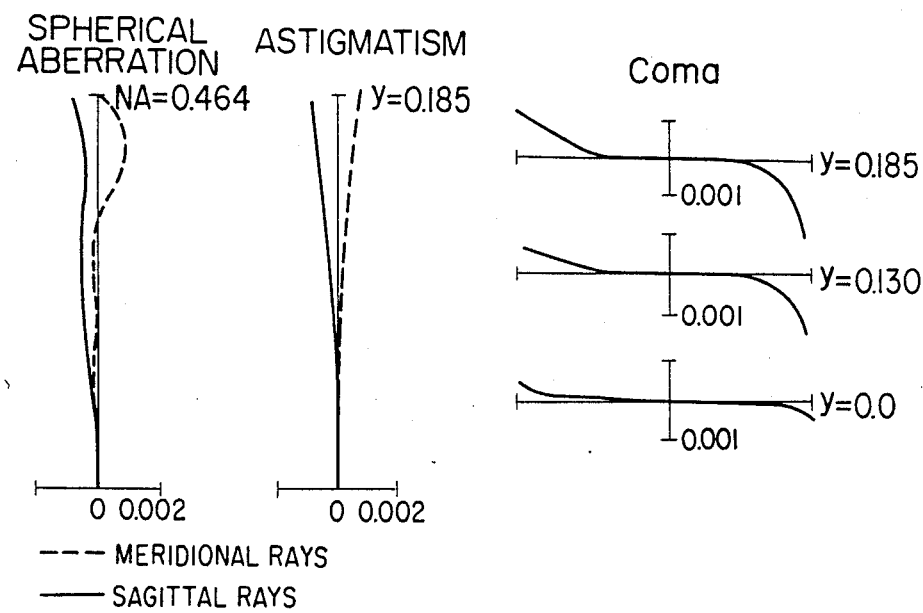
Figure 12F:
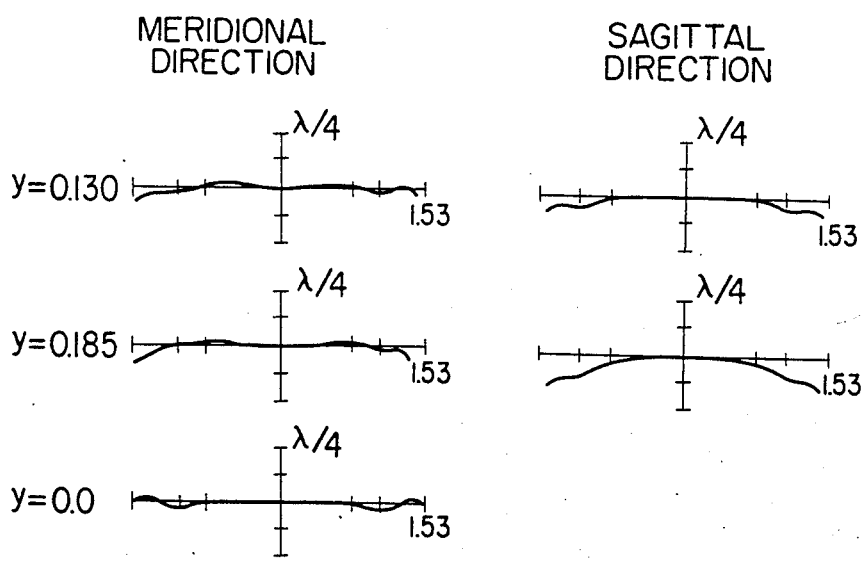

Therefore, in the present embodiment, the convergent lens is divided into two to thereby increase the degree of freedom of aberration correction and astigmatism is purposely created to keep balance between the meridional image plane and the sagittal image plane. FIG. 12A shows the optical path, FIGS. 12B, 12C and 12D show the gradient indices of the respective lenses, FIG. 12E shows ray aberrations, and FIG. 12F shows wave front aberration.

The numerical data of Embodiment 11 will be shown below.

NA = 0.46 WD = 2.6 mm $r_0$ = 1.15 mm
Maximum image height: 0.185 mm f = 2.5 mm

|  | Divergent lens $L_n$ | 1st convergent lens $L_{p1}$ | 2nd convergent lens $L_{p2}$ |
|---|---|---|---|
| Lens length Z | 2.82 | 4.79 | 4.21 |
| Center refractive index $n_0$ | 1.56 | 1.66666 | 1.66666 |
| g | 0.26 | 0.18 | 0.18 |
| $h_4$ | 0.440 | 0.586 | 0.197 |
| $h_6$ | 0.381 | −0.273 | 0.335 |

The present embodiment, like Embodiment 10, comprises three gradient index lenses.

Figure 13A:
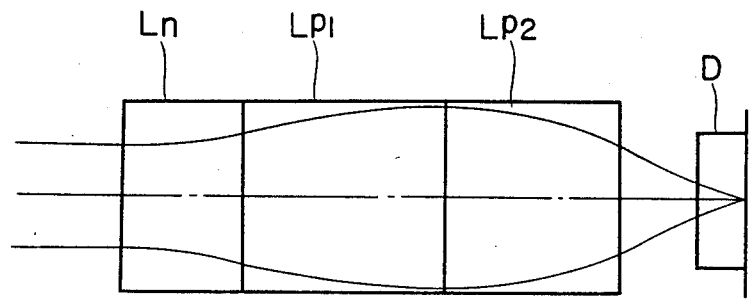
Figure 13B:
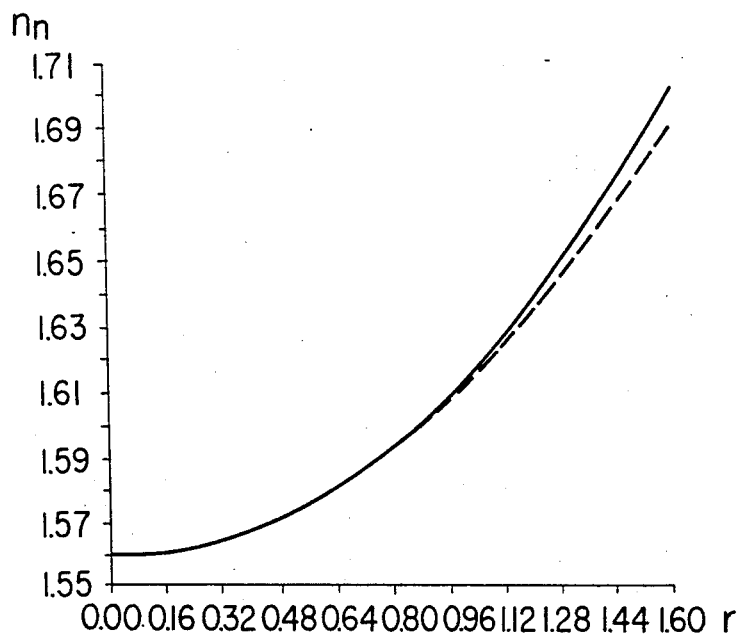
Figure 13C:
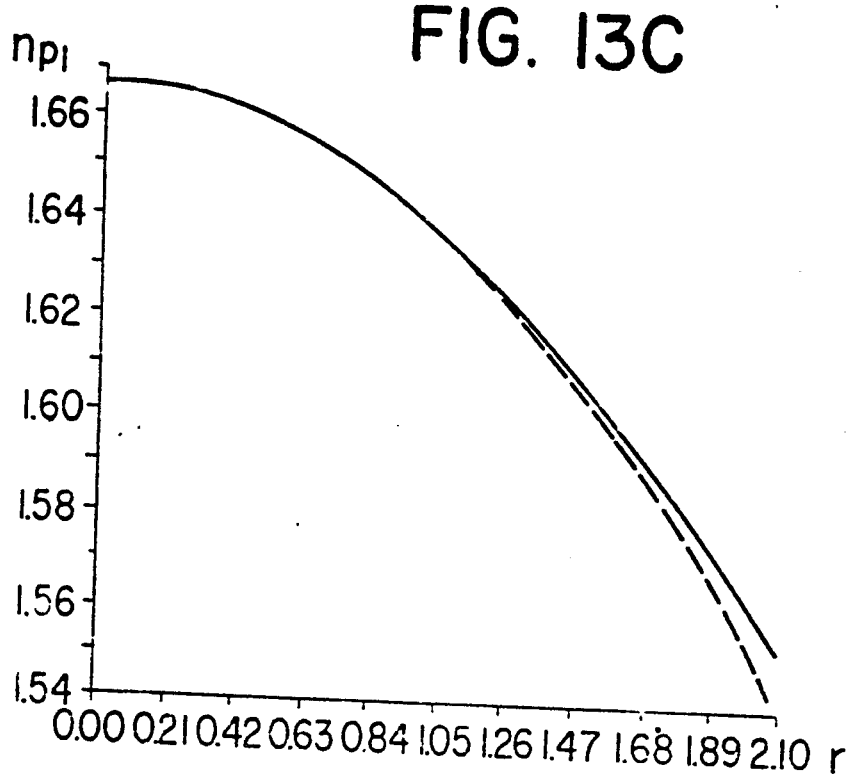
Figure 13D:
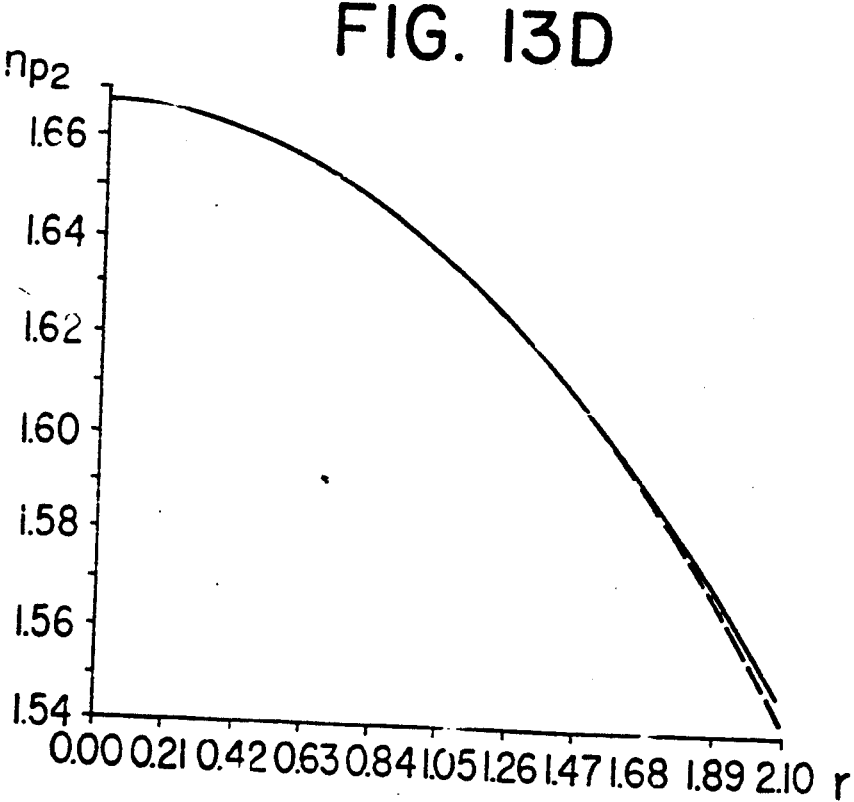
Figure 13E:
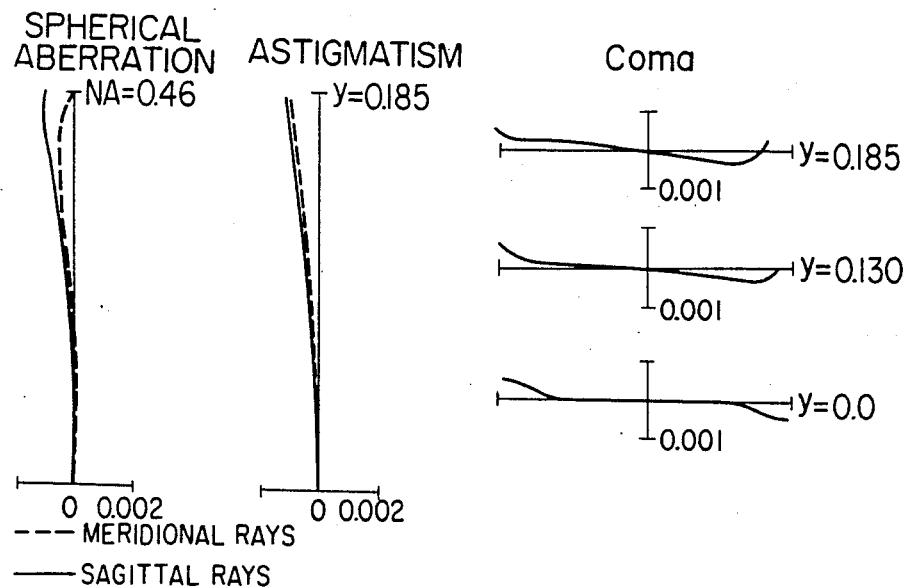
Figure 13F:
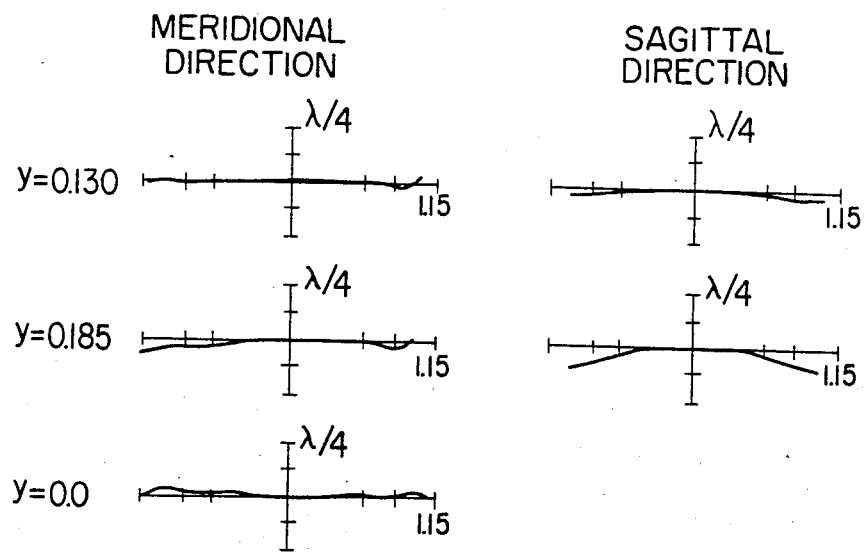

Since the degree of freedom of aberration correction is 3, all of spherical aberration, coma and astigmatism are well corrected and the gradient indices are selected so that the Petzval sum is sufficiently small, say, 0.0529. FIG. 13A shows the optical path, FIGS. 13B, 13C and 13D show the gradient indices of the respective lenses, FIG. 13E shows ray aberrations, and FIG. 13F shows wave front aberrations.

From the aberration illustrations, it is apparent that each of the embodiments of the present invention has an excellent performance as a pick-up lens for an optical disc and, as shown particularly in the wave front aberration illustrations, wave front aberration is considerably smaller than λ/4 regarded as the practial standard even at the maximum image height and coma and curvature of field are well corrected and therefore, each of these embodiments is also excellent in symmetry of the wave front.

I claim:

1. A gradient index lens system for use as a pick-up lens for an optical disc, in which spherical aberration and coma are well corrected and which has an excellent imaging performance, said lens system comprising:

a first gradient index lens of a convergent refractive power having a gradient index rotationally symmetrical with respect to the optical axis thereof and having a refractive index which continuously decreases as the radius from the optical axis increases until the periphery is reached, and a second gradient index lens of a convergent refractive power having a gradient index rotationally symmetrical with respect to the optical axis thereof and having a refractive index which continuously decreases as the radius from the optical axis increases until the periphery is reached, the gradient index of said first gradient index lens being different from that of said second gradient index lens, and the gradient index of said first and second gradient index lenses being so determined that spherical aberration and coma of said lens system are compensated, wherein when the gradient index $n_1$ of said first gradient index lens and the gradient index $n_2$ of said second gradient index lens are expressed by $$n_1^2 = n_{01}^2 \{1 - (g_1 r)^2 + h_{41}(g_1 r)^4 + h_{61}(g_1 r)^6\}$$

$$n_2^2 = n_{01}^2 \{1 - (g_2 r)^2 + h_{42}(g_2 r)^4 + h_{62}(g_2 r)^6\},$$

the following conditions are satisfied:

$$1.0 < h_{41} < 5.0$$

$$-1.5 < h_{61} < 0$$

$$-5.0 < h_{42} < -0.5$$

$$1.0 < h_{62} < 8.0$$

where $n_0$ is the center refractive index, r is the radial distance from the optical axis, g is a parameter indicative of the degree of refractive index gradient, $h_4$ and $h_6$ are the coefficients of the fourth order term and the sixth order term as the high order terms of gradient index, and subscript numbers 1 and 2 mean that the gradient indices are the amounts regarding said different first and second gradient index lenses.

2. A gradient index lens system according to claim 1, wherein numerical data are as follows:

| NA = 0.45, WD = 2.55, Maximum image height: 0.07 mm | | |
|---|---|---|
| $n_{01} = n_{02} = 1.7$ | $g_1 = g_2 = 0.243$ | $r_0 = 1.6$ mm |
| $h_{41} = 2.381$ | $h_{61} = -0.325$ | $z_1 = 1.57$ |
| $h_{42} = -2.591$ | $h_{62} = 3.655$ | $z_2 = 1.57$ | where $n_0$ is the center refractive index, $r_0$ is the effective diameter of a lens, g is a parameter indicative of the degree of refractive index gradient, $h_4$ and $h_6$ are the coefficients of the fourth order term and the sixth order term as the high order terms of gradient index, z is a lens length, and subscript numbers 1 and 2 mean that the gradient indices are the amounts regarding said different first and second gradient index lenses.

3. A gradient index lens system according to claim 1, wherein numerical data are as follows:

| NA = 0.45, WD = 2.55 mm, Maximum image height: 0.083 mm | | |
|---|---|---|
| $n_{01} = n_{02} = 1.66666$ | $g_1 = g_2 = 0.1974$ | $r_0 = 1.8$ mm |
| $h_{41} = 2.124$ | $h_{61} = -0.325$ | $z_1 = 2.215$ |
| $h_{42} = -2.476$ | $h_{62} = 4.055$ | $z_2 = 2.215$ | where $n_0$ is the center refractive index, $r_0$ is the effective diameter of a lens, g is a parameter indicative of the degree of refractive index gradient, $h_4$ and $h_6$ are the coefficients of the fourth order term and the sixth order term as the high order terms of gradient index, z is a lens length, and subscript numbers 1 and 2 mean that the gradient indices are the amounts regarding said different first and second gradient index lenses.

4. A gradient index lens system according to claim 1, wherein numerical data are as follows:

| NA = 0.45, WD = 2.55 mm, Maximum image height: 0.07 mm | | |
|---|---|---|
| $n_{01} = n_{02} = 1.66666$ | $g_1 = g_2 = 0.145$ | $r_0 = 2.2$ mm |
| $h_{41} = 1.860$ | $h_{61} = -0.322$ | $z_1 = 3.52$ |
| $h_{42} = -2.445$ | $h_{62} = 5.057$ | $z_2 = 3.52$ | where $n_0$ is the center refractive index, $r_0$ is the effective diameter of a lens, g is a parameter indicative of the degree of refractive index gradient, $h_4$ and $h_6$ are the coefficients of the fourth order term and the sixth order term as the high order terms of gradient index, z is a lens length, and subscript numbers 1 and 2 mean that the gradient indices are the amounts regarding said different first and second gradient index lenses.

5. A gradient index lens system according to claim 1, wherein numerical data are as follows:

| NA = 0.33, WD = 2.55, Maximum image height: 0.07 mm | | |
|---|---|---|
| $n_{01} = n_{02} = 1.66666$ | $g_1 = g_2 = 0.36$ | $r_0 = 1.0$ mm |
| $h_{41} = 2.607$ | $h_{61} = -0.726$ | $z_1 = 0.81$ |
| $h_{42} = -2.551$ | $h_{62} = 3.040$ | $z_2 = 0.81$ | where $n_0$ is the center refractive index, $r_0$ is the effective diameter of a lens, g is a parameter indicative of the degree of refractive index gradient, $h_4$ and $h_6$ are the coefficients of the fourth order term and the sixth order term as the high order terms of gradient index, z is a lens length, and subscript numbers 1 and 2 mean that the gradient indices are the amounts regarding said different first and second gradient index lenses.

6. A gradient index lens system for use as a pick-up lens for an optical disc, in which spherical aberration and coma are well corrected and which has an excellent imaging performance, said lens system comprising:

a first gradient index lens of a convergent refractive power having a gradient index rotationally symmetrical with respect to the optical axis thereof, said first gradient index lens extending continuously from its optical axis to its periphery and having a refractive index which continuously decreases as the radius from the optical axis increases until the periphery is reached, and a second gradient index lens of a convergent refractive power having a gradient index rotationally symmetrical with respect to the optical axis thereof, said second gradient index lens extending continuously from its optical axis to its periphery and having a refractive index which continuously decreases as the radius from the optical axis increases until the periphery is reached, the optical axes of said first and second gradient index lenses being collinear, the radius of the first gradient index lens being substantially the same as the radius of the second gradient index lens, the gradient index of said first gradient index lens being different from that of said second gradient index lens, and the gradient index of said first and second gradient index lenses being so determined that spherical aberration and coma of said lens system are compensated.

7. A gradient index lens system for use as a pick-up lens for an optical disc, in which spherical aberration and coma are well corrected and which has an excellent imaging performance, said lens system comprising:

a divergent gradient index lens component of a divergent refractive power having a gradient index rotationally symmetrical with respect to the optical axis thereof, said divergent gradient index lens component extending continuously from its optical axis to its periphery and having a refractive index which continuously increases as the radius from the optical axis increases until the periphery is reached, and a convergent gradient index lens component of a convergent refractive power having a gradient index rotationally symmetrical with respect to the optical axis thereof, said convergent gradient index lens component extending continuously from its optical axis to its periphery and having a refractive index which continuously decreases as the radius from the optical axis increases until the periphery is reached, the optical axes of said divergent gradient index lens component and said convergent gradient index lens component being collinear, the radius of the divergent gradient index lens component being substantially the same as the radius of the convergent gradient index lens component, said divergent gradient index lens component of a divergent refractive power decreasing the Petzval sum of the lens system, and the gradient index of said divergent and convergent gradient index lens components being so determined that spherical aberration and coma of said lens system are compensated.

8. A gradient index lens system for use as a pick-up lens for an optical disc, in which spherical aberration and coma are well corrected and which has an excellent imaging performance, said lens system comprising:

a divergent gradient index lens component of a divergent refractive power having a gradient index rotationally symmetrical with respect to the optical axis thereof and having a refractive index which continuously increases as the radius from the optical axis increases until the periphery is reached, and a convergent gradient index lens component of a convergent refractive power having a gradient index rotationally symmetrical with respect to the optical axis thereof and having a refractive index which continuously decreases as the radius from the optical axis increases until the periphery is reached, said divergent gradient index lens component of a divergent refractive power decreasing the Petzval sum of the lens system, and the gradient index of said divergent and convergent gradient index lens components being so determined that spherical aberration and coma of said lens system are compensated, wherein when the refractive index $n_n$ of said divergent gradient index lens component and the refractive index $n_p$ of said convergent gradient index lens component are respectively expressed by $$n_n^2 = n_{0n}^2 \{1 + (g_n r)^2 + h_{4n}(g_n r)^4 + h_{6n}(g_n r)^6\}$$

$$n_p^2 = n_{0p}^2 \{1 - (g_p r)^2 + h_{4p}(g_p r)^4 + h_{6p}(g_p r)^6\}$$

and said two lens components are cemented together, the following conditions are satisfied:

$$0.1 < g_p < 0.3$$

$$0.1 < g_n < 0.3$$

where $n_0$ is the center refractive index, r is the radial distance from the optical axis, g is a parameter indicative of the degree of refractive index gradient, $h_4$ and $h_6$ are the coefficients of the fourth order term and the sixth order term as the high order terms of the gradient index, subscript n means an amount regarding said divergent gradient index lens component, and subscript p means an amount regarding said convergent gradient index lens component.

9. A gradient index lens system according to claim 8, wherein said divergent gradient index lens component and said convergent gradient index lens component further satisfy the following conditions:

$$0 < h_{4p} < 1.0$$

$$-1.0 < h_{6p} < 1.5$$

$$0 < h_{4n} < 10.0$$

$$-1.0 < h_{6n} < 15.0.$$

10. A gradient index lens system according to claim 9 wherein numerical data are as follows:

| NA = 0.464, WD = 2.6 mm, $r_0$ = 1.53 mm Maximum image height: 0.185 mm Focal length: 3.3 mm | | |
|---|---|---|
| | Divergent lens $L_n$ | Convergent lens $L_p$ |
| Lens length Z | 2.60 | 7.67 |
| Center refractive index | 1.56 | 1.66666 |
| g | 0.2 | 0.18 |
| $h_4$ | 0.988 | 0.287 |

| -continued | | |
|---|---|---|
| NA = 0.464, WD = 2.6 mm, $r_0$ = 1.53 mm Maximum image height: 0.185 mm Focal length: 3.3 mm | | |
| | Divergent lens $L_n$ | Convergent lens $L_p$ |
| $h_6$ | 0.886 | 0.053 | where $r_0$ is the effective diameter of a lens, g is a parameter indicative of the degree of refractive index gradient and $h_4$ and $h_6$ are coefficients of the fourth order term and the sixth order term as the high order terms of gradient index, and subscript n means an amount regarding said divergent gradient index lens.

11. A gradient index lens system according to claim 9 wherein numerical data are as follows:

| NA = 0.464 WD = 2.6 mm $r_0$ = 1.53 mm Maximum image height: 0.185 mm Focal length: 3.3 mm | | |
|---|---|---|
| | Divergent lens $L_n$ | Convergent lens $L_p$ |
| Lens length Z | 4.49 | 5.69 |
| Center refractive index $n_0$ | 1.56 | 1.66666 |
| g | 0.12 | 0.2 |
| $h_4$ | 3.835 | 0.256 |
| $h_6$ | 8.487 | 0.029 | where $r_0$ is the effective diameter of a lens, g is a parameter indicative of the degree of refractive index gradient, and $h_4$ and $h_6$ are coefficients of the fourth order term and the sixth order term as the high order terms of gradient index, and subscript n means an amount regarding said divergent gradient index lens.

12. A gradient index lens system according to claim 9, wherein numerical data are as follows:

| NA = 0.4 WD = 2.6 mm $r_0$ = 1.15 mm Maximum image height: 0.185 mm focal length 2.5 mm | | |
|---|---|---|
| | Divergent lens $L_n$ | Convergent lens $L_p$ |
| Lens length Z | 3.67 | 5.13 |
| Center refractive index $n_0$ | 1.56 | 1.66666 |
| g | 0.2 | 0.24 |
| $h_4$ | 1.441 | 0.286 |
| $h_6$ | 1.669 | 0.022 | where $r_0$ is the effective diameter of a lens, g is a parameter indicative of the degree of refractive index gradient and $h_4$ and $h_6$ are coefficients of the fourth order term and the sixth order term as the high order terms of gradient index, and subscript n means an amount regarding said divergent gradient index lens.

13. A gradient index lens system according to claim 9 wherein numerical data are as follows:

| NA = 0.4 WD = 2.6 mm $r_0$ = 1.15 mm Maximum image height: 0.185 mm Focal length: 2.5 mm | | |
|---|---|---|
| | Divergent lens $L_n$ | Convergent lens $L_p$ |
| Lens length Z | 2.47 | 4.71 |
| Center refractive index $n_0$ | 1.56 | 1.666666 |
| g | 0.26 | 0.26 |
| $h_4$ | 1.045 | 0.255 |
| $h_6$ | 0.830 | 0.061 | where $r_0$ is the effective diameter of a lens, g is a parameter indicative of the degree of refractive index gradient and $h_4$ and $h_6$ are coefficients of the fourth order term and the sixth order term as the high order terms of gradient index, and subscript n means an amount regarding said divergent gradient index lens.

14. A gradient index lens system according to claim 9, wherein said convergent gradient index lens component includes a first gradient index lens of a convergent refractive power having a gradient index rotationally symmetrical with respect to the optical axis thereof and having a refractive index which continuously decreases as the radius from the optical axis increases until the periphery is reached, and a second gradient index lens of a convergent refractive power having a gradient index rotationally symmetrical with respect to the optical axis thereof and having a refractive index which continuously decreases as the radius from the optical axis increases until the periphery is reached, the gradient index of said first gradient index lens being different from that of said second gradient index lens.

15. A gradient index lens system according to claim 14, wherein numerical data are as follows:

| NA = 0.464 WD = 2.6 mm $r_0$ = 1.53 mm Maximum image height: 0.185 mm Focal length: 3.3 mm | | | |
|---|---|---|---|
| | Divergent lens $L_n$ | 1st convergent lens $L_{p1}$ | 2nd convergent lens $L_{p2}$ |
| Lens length Z | 1.96 | 2.56 | 2.56 |
| Center refractive index $n_0$ | 1.56 | 1.66666 | 1.66666 |
| g | 0.2 | 0.22 | 0.22 |
| $h_4$ | 2.898 | −0.547 | 0.740 |
| $h_6$ | 2.115 | 1.089 | −0.851 | where $r_0$ is the effective diameter of a lens, g is a parameter indicative of the degree of refractive index gradient and $h_4$ and $h_6$ are coefficients of the fourth order term and the sixth order term as the high order terms of gradient index.

16. A gradient index lens system according to claim 14, wherein numerical data are as follows:

| NA = 0.46 WD = 2.6 mm $r_0$ = 1.15 mm Maximum image height: 0.185 mm Focal length: 2.5 mm | | | |
|---|---|---|---|
| | Divergent lens $L_n$ | 1st convergent lens $L_{p1}$ | 2nd convergent lens $L_{p2}$ |
| Lens length Z | 2.82 | 4.79 | 4.21 |
| Center refractive index $n_0$ | 1.56 | 1.66666 | 1.66666 |
| g | 0.26 | 0.18 | 0.18 |
| $h_4$ | 0.440 | 0.586 | 0.197 |
| $h_6$ | 0.381 | −0.273 | 0.335 | where $r_0$ is the effective diameter of a lens, g is a parameter indicative of the degree of refractive index gradient, $h_4$ and $h_6$ are the coefficients of the fourth order term and the sixth order term as the high order terms of gradient index.

17. A gradient index lens system for use as a pick-up lens for an optical disc, in which spherical aberration and coma are well corrected and which has an excellent imaging performance, said lens system comprising:

a divergent gradient index lens component of a divergent refractive power having a gradient index rotationally symmetrical with respect to the optical axis thereof and having a refractive index which continuously increases as the radius from the optical axis increases until the periphery is reached, and a convergent gradient index lens component of a convergent refractive power having a gradient index rotationally symmetrical with respect to the optical axis thereof and having a refractive index which continuously decreases as the radius from the optical axis increases until the periphery is reached, said divergent gradient index lens component of a divergent refractive power decreasing the Petzval sum of the lens system, and the gradient index of said divergent and convergent gradient index lens components being so determined that spherical aberration and coma of said lens system are compensated, wherein when the refractive index $n_n$ of said divergent gradient index lens component and the refractive index $n_p$ of said convergent gradient index lens component are respectively expressed by $$n_n{}^2 = n_{0n}^2\{1 + (g_n r)^2 + h_{4n}(g_n r)^4 + h_{6n}(g_n r)^6\}$$

$$n_p{}^2 = n_{0p}^2\{1 - (g_p r)^2 + h_{4p}(g_p r)^4 + h_{6p}(g_p r)^6\}$$

and said two lens components are separated from each other by a spacing $Z_0$, the following conditions are satisfied:

$$0.1 < g_p < 0.3$$

$$0.1 < g_n < 0.3$$

$$0 \leq Z_0 < 3.0$$

where $n_0$ is the center refractive index, r is the radial distance from the optical axis, g is a parameter indicative of the degree of refractive index gradient, $h_4$ and $h_6$ are the coefficients of the fourth order term and the sixth order term as the high order terms of the gradient index, subscript n means an amount regarding said divergent gradient index lens component, and subscript p means an amount regarding said convergent gradient index lens component.

18. A gradient index lens system according to claim 17, wherein said divergent gradient index lens and said convergent gradient index lens further satisfy the following conditions:

$$0 < h_{4p} < 1.0$$

$$-1.0 < h_{6p} < 1.5$$

$$0 < h_{4n} < 10.0$$

$$-1.0 < h_{6n} < 15.0.$$

19. A gradient index lens system according to claim 18, wherein numerical data are as follows:

| NA = 0.464 WD = 2.6 mm $r_0$ = 1.53 mm Maximum image height: 0.185 mm focal length: 3.3 mm $Z_0$ = 1.8 mm | | |
|---|---|---|
| | Divergent lens $L_n$ | Convergent lens $L_p$ |
| Lens length Z | 0.91 | 4.36 |
| Center refractive index $n_0$ | 1.56 | 1.66666 |
| g | 0.2 | 0.22 |
| $h_4$ | 2.661 | 0.286 |

-continued

| | Divergent lens $L_n$ | Convergent lens $L_p$ |
|---|---|---|
| \multicolumn{3}{l}{NA = 0.464 WD = 2.6 mm $r_0$ = 1.53 mm} |
| \multicolumn{3}{l}{Maximum image height: 0.185 mm focal length: 3.3 mm} |
| \multicolumn{3}{l}{$Z_0$ = 1.8 mm} |
| $h_6$ | 4.133 | 0.006 | where $r_0$ is the effective diameter of a lens, g is a parameter indicative of the degree of refractive index gradient and $h_4$ and $h_6$ are coefficients of the fourth order term and the sixth order term as the high order terms of gradient index, and subscript n means an amount regarding said divergent gradient index lens.

20. A gradient index lens system in which spherical aberration and coma are well corrected and which has an excellent imaging performance, said lens system comprising:

a first convergent gradient index lens and a second convergent gradient index lens, said second gradient index lens having a gradient index different from that of said first gradient index lens, and when the gradient indices $n_1$ and $n_2$ of said lenses are expressed by $$n_1^2 = n_{01}^2 \{1 - (g_1 r)^2 + h_{41}(g_1 r)^4 + h_{61}(g_1 r)^6\}$$

$$n_2^2 = n_{01}^2 \{1 - (g_2 r)^2 + h_{42}(g_2 r)^4 + h_{62}(g_2 r)^6\},$$

the following conditions are satisfied:

$1.0 < h_{41} < 5.0$ $-1.5 < h_{61} < 0$ $-5.0 < h_{42} < -0.5$ $1.0 < h_{62} < 8.0$ where $n_0$ is the center refractive index, r is the radial distance from the optical axis, g is a parameter indicative of the degree of refractive index gradient, $h_4$ and $h_6$ are the coefficients of the fourth order term and the sixth order term as the high order terms of gradient index, and subscript numbers 1 and 2 mean that the gradient indices are the amounts regarding said different first and second gradient index lenses.

21. A gradient index lens system in which spherical aberration and coma are well corrected and which has an excellent imaging performance, said lens system comprising:

a convergent gradient index lens and a divergent gradient index lens, said divergent gradient index lens decreasing the Petzval sum so as to compensate curvature of field, wherein when the refractive index $n_n$ of said divergent gradient index lens and the refractive index $n_p$ of said convergent gradient index lens are respectively expressed by $$n_n^2 = n_{0n}^2 \{1 + (g_n r)^2 + h_{4n}(g_n r)^4 + h_{6n}(g_n r)^6\}$$

$$n_p^2 = n_{0p}^2 \{1 - (g_p r)^2 + h_{4p}(g_p r)^4 + h_{6p}(g_p r)^6\}$$

the following conditions being satisfied:

$0.1 < g_p < 0.3$ $0.1 < g_n < 0.3$ where $n_0$ is the center refractive index, r is the radial distance from the optical axis, g is a parameter indicative of the degree of refractive index gradient, $h_4$ and $h_6$ are the coefficients of the fourth order term and the sixth order term as the high order terms of the gradient index, subscript n means an amount regarding said divergent gradient index lens, and subscript p means an amount regarding said convergent gradient index lens.

22. A gradient index lens system according to claim 21, wherein said divergent gradient index lens and said convergent gradient index lens further satisfy the following conditions:

$0 < h_{4p} < 1.0$ $-1.0 < h_{6p} < 1.5$ $0 < h_{4n} < 10.0$ $-1.0 < h_{6n} < 15.0.$

23. A gradient index lens system according to claim 22, wherein said divergent gradient index lens and said convergent gradient index lens are separated from each other by a spacing $Z_0$, and wherein the following condition is satisfied:

$0 \leq Z_0 < 3.0.$

* * * * *